United States Patent
Moriyama et al.

(10) Patent No.: US 12,415,954 B2
(45) Date of Patent: Sep. 16, 2025

(54) METHOD OF PRODUCING CORE/SHELL SEMICONDUCTOR NANOPARTICLES

(71) Applicant: SHOEI CHEMICAL INC., Tokyo (JP)

(72) Inventors: Takafumi Moriyama, Tosu (JP); Yuko Mitsuka, Tosu (JP); Hirokazu Sasaki, Tosu (JP); Makoto Kido, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 483 days.

(21) Appl. No.: 17/800,801

(22) PCT Filed: Feb. 16, 2021

(86) PCT No.: PCT/JP2021/005707
§ 371 (c)(1),
(2) Date: Aug. 18, 2022

(87) PCT Pub. No.: WO2021/166908
PCT Pub. Date: Aug. 26, 2021

(65) Prior Publication Data
US 2023/0097120 A1    Mar. 30, 2023

(30) Foreign Application Priority Data

Feb. 21, 2020    (JP) ................. 2020-027647

(51) Int. Cl.
| | | |
|---|---|---|
| C09K 11/88 | (2006.01) | |
| B82Y 20/00 | (2011.01) | |
| B82Y 40/00 | (2011.01) | |
| C09K 11/02 | (2006.01) | |
| C09K 11/70 | (2006.01) | |

(52) U.S. Cl.
CPC ............ *C09K 11/883* (2013.01); *C09K 11/02* (2013.01); *C09K 11/703* (2013.01); *B82Y 20/00* (2013.01); *B82Y 40/00* (2013.01); *C01P 2004/84* (2013.01)

(58) Field of Classification Search
CPC ..... C09K 11/883; C09K 11/703; C09K 11/02; C01P 2004/84
See application file for complete search history.

(56) References Cited

U.S. PATENT DOCUMENTS

| | | |
|---|---|---|
| 2011/0223110 A1 | 9/2011 | Bartel et al. |
| 2011/0300076 A1* | 12/2011 | Tulsky .................. B82Y 30/00 435/7.8 |
| 2016/0304775 A1 | 10/2016 | Vogel |
| 2017/0233645 A1 | 8/2017 | Zhong et al. |

FOREIGN PATENT DOCUMENTS

| | | |
|---|---|---|
| CN | 110511747 A | 11/2019 |
| JP | 2015529698 A | 10/2015 |
| JP | 2019151513 A | 9/2019 |
| TW | 201934721 A | 9/2019 |
| WO | 2008140495 A2 | 11/2008 |
| WO | 2019131401 A1 | 7/2019 |
| WO | 2019131402 A1 | 7/2019 |

OTHER PUBLICATIONS

Yong et al., "Imaging Pancreatic Cancer Using Bioconjugated InP Quantum Dots", ACSNANO, vol. 3, No. 3, pp. 502-510, Feb. 25, 2009.*
China National Intellectual Property Administration, Office Action and Search Report Issued in Application No. 202180015333.X, Jun. 5, 2024, 14 pages.
Yong, K. et al., "Imaging Pancreatic Cancer Using Bioconjugated InP Quantum Dots," ACS Nano, vol. 3, No. 3, Feb. 25, 2009, 9 pages.
China National Intellectual Property Administration, Office Action and Search Report Issued in Application No. 202180015333.X, Oct. 28, 2023, 16 pages.
Xie, R. et al., "Synthesis and Characterization of Highly Luminescent CdSe-Core CdS/Zn0.5Cd0.5S/ZnS Multishell Nanocrystals," Journal of the American Chemical Society, vol. 127, No. 20, Apr. 29, 2005, 9 pages.
Yong, K.T. et al., "Imaging Pancreatic Cancer Using Bioconjugated InP Quantum Dots," ACS Nano, vol. 3, No. 3, Mar. 24, 2009, 19 pages.
European Patent Office, Extended European Search Report Issued in Application No. 21756779.1, Feb. 20, 2024, 6 pages.

* cited by examiner

*Primary Examiner* — C. Melissa Koslow
(74) *Attorney, Agent, or Firm* — Alleman Hall & Tuttle LLP

(57) ABSTRACT

A method of producing core/shell semiconductor nanoparticles, the method comprising a shell formation step of adding a solution of group VI element precursor while adding a solution of zinc branched chain carboxylate to a core particle-dispersed solution to allow the zinc branched chain carboxylate to react with the group VI element precursor in presence of the core particles for forming a shell containing zinc and the group VI element on surfaces of the core particles. The present invention can provide a simple semiconductor nanoparticle production method of producing core/shell semiconductor nanoparticles with excellent optical properties when two or more types of the shell precursors are used to produce the core/shell semiconductor nanoparticles.

19 Claims, No Drawings

METHOD OF PRODUCING CORE/SHELL SEMICONDUCTOR NANOPARTICLES

TECHNICAL FIELD

This invention relates to a method of producing core/shell semiconductor nanoparticles.

BACKGROUND ART

Semiconductor nanoparticles (quantum dots: QDs) of minute particle size are used as wavelength conversion materials in displays. These semiconductor nanoparticles are tiny particles that can exhibit quantum confinement effects, and the width of the band gap differs depending on the size of the nanoparticles. Excitons formed in semiconductor particles by photoexcitation, charge injection or other means emit photons with energy corresponding to the band gap through recombination, making it possible to control the emission wavelength by adjusting the crystal size of the semiconductor nanoparticles, thereby obtaining emission at the desired wavelength.

Currently, semiconductor nanoparticles with a core/shell structure are widely used as semiconductor nanoparticles, because the core/shell structure fills dangling bonds on the core surface and reduces surface defects.

Semiconductor nanoparticles each composed of a group III-V core and a group II-VI shell are used as such core/shell structure semiconductor nanoparticles. However, due to the difference in lattice constants between the group III-V core and the group II-VI shell, defect levels are easily formed, and semiconductor nanoparticles with defect levels easily lose optical properties due to non-emission recombination of excitons through the defect levels. Therefore, it is important to form the group II-VI shell on the surface of the group III-V core with reduced generation of defect levels.

The SILAR method is known as a method to form a shell on the surface of core particles. In the SILAR method, shell precursors are alternately added to the core particles, and the added shell precursors react on the particle surface to form a shell. For example, the shell is formed by adding a Zn precursor first to the core particles, then a S precursor, then a Zn precursor, then the S precursor, and the like, alternately bringing the core particles into contact with two types of shell precursors that are materials for the shell, to form alternating layers of two types of shell precursors on the particle surface. The shell is formed by reaction of these two types of shell precursors.

CITATION LIST

Patent Literature

Non-Patent Literature 1: Renguo Xie et al., J. AM. CHEM. SOC., 127, 7480-7488 (2005).
Non-Patent Literature 2: Ken-Tye Yong et al., ACS Nano, 3, 502-510 (2009)

INVENTION DISCLOSURE

Problem to be Solved by the Invention

However, the SILAR method requires strict control of the amount of precursor added in the formation of each precursor layer. If the amount of precursor added is too small, the shell cannot be formed adequately. If the amount of precursor added is too large, the excess amount of precursor may cause particle transformation and the formation of byproducts.

In addition, two types of shell precursors are brought into contact with the particles separately and alternately multiple times, thereby complicating the semiconductor nanoparticle production method.

Therefore, the present invention is aimed at providing a simple semiconductor nanoparticle production method of producing core/shell semiconductor nanoparticles with excellent optical properties when two or more types of the shell precursors are used to produce the core/shell semiconductor nanoparticles.

Means to Solve the Problem

As a result of diligent study to solve the above problem, the inventors of the present invention have found: with use of zinc branched chain carboxylate as a group II element precursor that is added to the core particle dispersed solution to react with a group VI element precursor on surfaces of the core particles, the group II element precursor is brought into contact with the group VI element precursor in whole amounts at a time for the reaction therebetween to provide core/shell semiconductor nanoparticles with excellent optical properties, without the need to bring the group II element precursor into contact with a group IV element precursor separately and alternately several times, and completed the present invention.

In other words, the present invention (1) provides a method of producing core/shell semiconductor nanoparticles. The method includes a shell formation step of adding a solution of group VI element precursor while adding a solution of zinc branched chain carboxylate to a core particle-dispersed solution to allow the zinc branched chain carboxylate to react with the group VI element precursor in the presence of the core particles for forming a shell containing zinc and the group VI element on surfaces of the core particles.

In addition, the invention (2) provides a method of producing core/shell semiconductor nanoparticles. The method includes a shell formation step of adding a solution of zinc branched chain carboxylate and group VI element precursor to a core particle-dispersed solution to allow the zinc branched chain carboxylate to react with the group VI element precursor in the presence of the core particles for forming a shell containing zinc and the group VI element on surfaces of the core particles.

In addition, the invention (3) provides a method of producing core/shell semiconductor nanoparticles according to (1) or (2), in which the group VI element includes at least Se.

In addition, the present invention (4) provides a method of producing core/shell semiconductor nanoparticles according to any one of (1) to (3), in which the group VI element includes at least trialkylphosphine selenide.

In addition, invention (5) provides a method of producing core/shell semiconductor nanoparticles. The method includes a shell formation step of adding a solution of zinc branched chain carboxylate to a core particle-dispersed solution and then adding a solution of group VI element precursor including at least a Se precursor to allow the zinc branched chain carboxylate to react with the group VI element precursor in the presence of the core particles for forming a shell containing zinc and the group VI element on surfaces of the core particles.

In addition, the invention (6) provides a method of producing core/shell semiconductor nanoparticles according to (5), in which the Se precursor is trialkylphosphine selenide.

In addition, the present invention (7) provides a method of producing core/shell semiconductor nanoparticles according to any one of (1) to (6), in which the core particle contains In and P.

In addition, the present invention (8) provides a method of producing core/shell semiconductor nanoparticles according to any one of (1) to (7), in which the zinc branched chain carboxylate(s) is one or more selected from the group consisting of zinc 2-ethylhexanoate, zinc 3,5,5-trimethylhexanoate and zinc 16-methylheptadecanoate.

In addition, the present invention (9) provides a method of producing core/shell semiconductor nanoparticles according to any one of (1) and (3) to (8), in which a solvent(s) of the solution of zinc branched chain carboxylate is at least one selected from the group consisting of 1-octadecene, hexadecane, squalane, squalene, mineral spirits and liquid paraffin.

In addition, the present invention (10) provides a method of producing core/shell semiconductor nanoparticles according to any one of (2) to (4), (7) and (8), in which a solvent(s) of the solution of zinc branched chain carboxylate and group VI element precursor is at least one selected from the group consisting of 1-octadecene, hexadecane, squalane, squalene, mineral spirits and liquid paraffin.

In addition, the present invention (11) provides a method of producing core/shell semiconductor nanoparticles according to any one of (1), (3), (4) and (7) to (9), in which a solvent(s) of the solution of group VI element precursor is at least one selected from the group consisting of 1-octadecene, hexadecane, squalane, squalene, mineral spirits and liquid paraffin.

In addition, the present invention (12) provides a method of producing core/shell semiconductor nanoparticles according to any one of (5) to (9), in which a solvent(s) of the solution of group VI element precursor including at least Se precursor is at least one selected from the group consisting of 1-octadecene, hexadecane, squalane, squalene, mineral spirits and liquid paraffin.

In addition, the present invention (13) provides a method of producing core/shell semiconductor nanoparticles according to any one of (1), (3) to (9), (11) and (12), in which the solution of zinc branched chain carboxylate is in liquid form at 25° C. and 1 atm.

In addition, the present invention (14) provides a method of producing core/shell semiconductor nanoparticles according to any one of (2) to (4), (7), (8) and (10), in which the solution of zinc branched chain carboxylate and group VI element precursor is in liquid form at 25° C. and 1 atm.

In addition, the present invention (15) provides a method of producing core/shell semiconductor nanoparticles according to any one of (1) to (14), in which the zinc branched chain carboxylate reacts with the group VI element precursor at 180 to 320° C.

In addition, the present invention (16) provides a method of producing core/shell semiconductor nanoparticles according to (15), in which the zinc branched chain carboxylate reacts with the group VI element precursor at 250 to 320° C.

In addition, the present invention (17) provides a method of producing core/shell semiconductor nanoparticles according to any one of (1) to (16), in which the zinc branched chain carboxylate is added to meet a molar ratio of Zn (Zn/In) ranging from 7 to 50 with respect to In in the core particle.

In addition, the present invention (18) provides a method of producing core/shell semiconductor nanoparticles according to any one of (1) to (17), in which a time for adding the zinc branched chain carboxylate to the core particle-dispersed solution is 5 to 600 minutes.

In addition, the present invention (19) provides a method of producing core/shell semiconductor nanoparticles according to (18), in which a time for adding the zinc branched chain carboxylate to the core particle-dispersed solution is 30 to 180 minutes.

In addition, the present invention (20) provides a method of producing core/shell semiconductor nanoparticles according to any one of (1) to (19), the method including adding either:
  the solution of zinc branched chain carboxylate, and either one of the solution of group VI element precursor and the solution of group VI element precursor including at least a Se precursor; or
  the solution of zinc branched chain carboxylate and group VI element precursor, to the core particle-dispersed solution while heating the core particle-dispersed solution.

In addition, the present invention (21) provides a method of producing core/shell semiconductor nanoparticles according to any one of (1) to (20), in which the zinc branched chain carboxylate reacts with the group VI element precursor in the presence of a dispersant.

In addition, the present invention (22) provides a method of producing core/shell semiconductor nanoparticles according to any one of (1) to (21), in which the zinc branched chain carboxylate reacts with the group VI element precursor in the presence of a halogen element.

In addition, the present invention (23) provides a method of producing core/shell semiconductor nanoparticles according to (22), in which the halogen element is Cl or Br.

In addition, the present invention (24) provides a method of producing core/shell semiconductor nanoparticles according to any one of (1) to (23), the method not including a step of purifying the core particles.

In addition, the present invention (25) provides a core/shell semiconductor nanoparticle composite including a core/shell semiconductor nanoparticle having a surface to which a ligand is coordinated, in which
  the shell contains at least Zn and Se, and
  the core/shell semiconductor nanoparticle composite includes a branched chain carboxylic acid as the ligand.

The present invention (26) refers to the core/shell semiconductor nanoparticle composite according to (25) containing the branched chain carboxylic acid ligand at a molar fraction of 20.0 to 80.0 mol %, with respect to all ligands coordinated to the core/shell semiconductor nanoparticle.

In addition, the present invention (27) provides a core/shell semiconductor nanoparticle composite according to (25) or (26), in which the branched chain carboxylic acid(s) is one or more selected from the group consisting of 2-ethylhexanoic acid, 3,5,5-trimethylhexanoic acid and 16-methylheptadecanoic acid.

In addition, the present invention (28) provides a core/shell semiconductor nanoparticle composite according to any one of (25) to (27) exhibiting a full width at half maximum (FWHM) of 35 nm or less in its emission spectrum.

In addition, the present invention (29) provides a core/shell semiconductor nanoparticle composite according to any one of (25) to (28) exhibiting a quantum yield (QY) of 80% or more.

Effect of the Invention

The present invention can provide a simple semiconductor nanoparticle production method of producing core/shell semiconductor nanoparticles with excellent optical properties when two or more types of the shell precursors are used to produce the core/shell semiconductor nanoparticles.

EMBODIMENTS FOR CARRYING OUT THE INVENTION

A method of producing core/shell semiconductor nanoparticles according to the present invention includes one of the following steps: a shell formation step (1-i), a shell formation step (1-ii) and a shell formation step (1-iii), as a step of forming a shell containing zinc and a group VI element on surfaces of core particles.

The method of producing core/shell semiconductor nanoparticles according to a first embodiment of the present invention includes a shell formation step (also referred to as the shell formation step (1-i)) of (i) adding a solution of a group VI element precursor while adding a solution of a zinc branched-chain carboxylate to a core particle-dispersed solution to allow the zinc branched-chain carboxylate to react with the group VI element precursor in the presence of the core particles for forming the shell containing zinc and the group VI element on the surfaces of the core particles.

The method of producing core/shell semiconductor nanoparticles according to a second embodiment of the present invention includes a shell formation step (also referred to as the shell formation step (1-ii)) of (ii) adding a solution of the zinc branched-chain carboxylate and the group VI element precursor to the core particle-dispersed solution to allow the zinc branched-chain carboxylate to react with the group VI element precursor in the presence of the core particles for forming the shell containing zinc and the group VI element on the surfaces of the core particles.

The method of producing core/shell semiconductor nanoparticles according to a third embodiment of the present invention includes a shell formation step (also referred to as the shell formation step (1-iii)) of (iii) adding the solution of the zinc branched-chain carboxylate to the core particle-dispersed solution, then adding a solution of the group VI element precursor including at least a Se precursor to allow the zinc branched-chain carboxylate to react with the group VI element precursor in the presence of the core particles for forming the shell containing zinc and the group VI element on the surfaces of the core particles.

Hereinafter, the shell formation step (1-i), the shell formation step (1-ii) and the shell formation step (1-iii) are collectively referred to as the shell formation step (1) for explanations of common respects in these steps.

Hereinafter, the sign "~" represents a numerical range including numerical values given before and after the sign "~" unless otherwise specified. In other words, "circle~triangle" refers to circle or more and triangle or less.

The shell formation step (1-i) is the step of (i) adding the solution of the group VI element precursor while adding the solution of the zinc branched-chain carboxylate to the core particle-dispersed solution to allow the zinc branched-chain carboxylate to react with the group VI element precursor in the presence of the core particles for forming the shell containing zinc and the group VI element on the surfaces of the core particles.

The shell formation step (1-ii) is the step of (ii) adding the solution of the zinc branched-chain carboxylate and the group VI element precursor to the core particle-dispersed solution to allow the zinc branched-chain carboxylate to react with the group VI element precursor in the presence of the core particles for forming the shell containing zinc and the group VI element on the surfaces of the core particles.

The shell formation step (1-iii) of (iii) adding the solution of the zinc branched-chain carboxylate to the core particle-dispersed solution, then adding the solution of the group VI element precursor including at least the Se precursor to allow the zinc branched-chain carboxylate to react with the group VI element precursor in the presence of the core particles for forming the shell containing zinc and the group VI element on the surfaces of the core particles.

The zinc precursor to be added to the core particle-dispersed solution, that is, the zinc precursor to react with the VI element precursor at the shell formation step (1) refers to the zinc branched-chain carboxylate. The branched-chain carboxylic acid refers to a carboxylic acid having a hydrocarbon main chain and a branched chain(s) branched from the main chain. Examples of the branched-chain carboxylic acid include 2-ethylhexanoic acid, 3,5,5-trimethylhexanoic acid and 16-methylheptadecanoic acid. In other words, examples of the zinc precursor include zinc 2-ethylhexanoate, zinc 3,5,5-trimethylhexanoate, and zinc 16-methylheptadecanoate. One type of the zinc branched chain carboxylate may be used alone, or two or more types thereof may be used in combination. The zinc precursor is not limited to zinc 2-ethylhexanoate, zinc 3,5,5-trimethylhexanoate and zinc 16-methylheptadecanoate, as long as it is in liquid form at 25° C. and 1 atom when the zinc branched chain carboxylate is dissolved into a solvent as described below.

Se precursors, S precursors and Te precursors are examples of the group VI element precursor to be added to the core particle-dispersed solution, that is, the group VI element precursor to react with the zinc precursor at the shell formation step (1-i) or the shell formation step (1-ii). One type of the group VI element precursor may be used alone, or two or more types thereof may be used in combination. The group VI element precursor preferably contains at least the Se precursor. That is, the group VI element precursor to react with the zinc precursor may be a precursor of any one type of the VI elements, such as the Se precursor alone. Instead, the group VI element precursor to react with the zinc precursor may refer to a combination of two or more types of the VI elements, such as a combination of the Se precursor and the S precursor, a combination of the Se precursor and the Te precursor, and a combination of the Se precursor, the S precursor and the Te precursor. One type of the Se precursor alone used at the shell formation step (1-i) or the shell formation step (1-ii) brings more advantageous effect on the invention of the present application.

At the shell formation step (1-iii), the group VI element precursor to be added to the core particle-dispersed solution, in other words, the group VI element precursor to react with the zinc precursor, is the group VI element precursor, and at least part of the group VI element precursor(s) is the Se precursor. In other words, the "solution of group VI element precursor including at least Se precursor" to be added to the core particle-dispersed solution at the shell formation step (1-iii) contains at least the Se precursor as the VI element precursor. The "solution of the group VI element precursor including at least Se precursor" may also contain a precursor of the VI element other than Se. Examples of such a VI element precursor include a S precursor and a Te precursor. In the solution of the group VI element precursor including at least the Se precursor for the shell formation step (1-iii), the ratio of the Se precursor with respect to the total of the VI element precursor(s) is preferably 50 mol % or more, more preferably 80 mol % or more, more preferably 90 mol % or more, and particularly preferably 100%.

At the shell formation step (1), the Se precursor is not particularly limited, and may be trialkylphosphine selenide, selenol or the like, for example. The trialkylphosphine selenide is preferred as the Se precursor. One type of the Se precursor may be used alone, or two or more types thereof may be used in combination.

At the shell formation step (1), the S precursor is not particularly limited. Examples of the S precursor include: trialkylphosphines sulfide such as trioctylphosphine sulfide and tributylphosphine sulfide; thiols; and bis(trimethylsilyl) sulfide. Trioctylphosphine sulfide is preferred as the S precursor. One type of the S precursor may be used alone, or two or more types thereof may be used in combination.

At the shell formation step (1), the Te precursor is not particularly limited. Examples of the Te precursor include trioctylphosphine telluride. Trioctylphosphine telluride is preferred as the Te precursor. One type of the Te precursor may be used alone, or two or more types thereof may be used in combination.

As the group VI element precursor at the shell formation step (1), the use of the Se precursor only allows for formation of the shell layer containing zinc and Se, and the combination use of the Se precursor and the S precursor allows for formation of the shell layer containing zinc, Se and S. The combination use of the Se precursor and the Te precursor allows for formation of the shell layer containing zinc, Se and Te. The combination use of the Se precursor, the S precursor and the Te precursor allows for formation of the shell layer containing zinc, Se, S and Te.

The core particles on which the shell layer is formed at the shell formation step (1) are not particularly limited as long as they are used as the core particles of core/shell semiconductor nanoparticles, and preferably refer to core particles containing In and P, and particularly preferably refer to core particles containing In, P and a halogen(s). It is preferable that the core particles contain In and P to provide semiconductor nanoparticles with low load on the environment and good optical properties. It is preferable that the core particles contain the halogen(s) to provide core particles and semiconductor nanoparticles with improved optical properties. The halogen contained in the core particles may be any of F, Cl, Br and I. Among these, Cl or Br is preferred as the halogen to enhance narrowed full width at half maximum and reduced Stokes shift. The core particles may contain another element, Ga, Al, Zn, N, S, Si, Ge or the like, as well.

When the core particles contain In and P, the molar ratio of P to In is 0.20 to 1.20, preferably 0.20 to 0.95, and more preferably 0.40 to 0.95, in terms of the number of atoms in the core particles. The above range of the molar ratio of P to In achieves high quantum yield, reduced full width at half maximum and reduced Stokes shift.

When the core particles contain the halogen(s), the molar ratio of the halogen(s) to In is 0.80 to 15.00, and preferably 1.00 to 15.00, in terms of the number of atoms in the core particles. The above range of the molar ratio of the halogen(s) to In achieves high quantum yield, reduced full width at half maximum and reduced Stokes shift. When the core particles contain two or more types of the halogen, the molar ratio of the halogen to In refers to the ratio of the total moles of two or more types of the halogen to the mole of In.

The Cd content of the core particles is 100 mass ppm or less, preferably 80 mass ppm or less, and particularly preferably 50 mass ppm or less.

The average diameter of the core particles is not particularly limited, but is preferably 1.0 nm to 5.0 nm. The above range of the average particle size of the core particles enables conversion of excitation light with 450 nm into green to red luminescence. In the present invention, the average particle diameter of the core particles is determined by calculating particle diameters of 10 or more particles as equivalent circular area diameters (Heywood diameter) from images of the particles observed by transmission electron microscopy (TEM).

The method of synthesizing the core particles is not particularly limited and may be selected as appropriate. The In precursor, P precursor, and halogen precursor used in the present invention are described as follows.

The In precursor is not particularly limited. Examples of the In precursor include: indium carboxylates such as indium acetate, indium propionate, indium myristate and indium oleate; indium halides such as indium fluoride, indium bromide and indium iodide; indium thiolate; and trialkylindium.

The P precursor is not particularly limited. Examples of the P precursor include tris(trimethylsilyl)phosphine, tris(trimethylgermyl)phosphine, tris(dimethylamino)phosphine, tris(diethylamino)phosphine, tris(dioctylamino)phosphine, trialkyl phosphine and $PH_3$ gas. When tris(trimethylsilyl)phosphine is used as the P precursor, Si may be incorporated into the semiconductor nanoparticles, not impairing the function of the present invention.

The halogen precursor is not particularly limited. Examples of the halogen precursor include: HF, HCl, HBr, HI, carboxylic acid halides such as oleyl chloride, oleyl bromide, octanoyl chloride, octanoyl bromide and oleoyl chloride, and metal halides such as zinc chloride, indium chloride and gallium chloride.

The following methods are employed as the method of synthesizing the core particles containing In and P. The following methods of synthesizing the core particles are merely examples. The core particles are not limited to those synthesized by the following synthesis methods. The core particles can be synthesized by allowing the In precursor to react with the P precursor, for example. The core particle-dispersed solution with the core particles dispersed therein can be obtained by mixing the In precursor with the solvent first, mixing the resulting solution with the In precursor solution supplemented with the dispersant and/or an additive in vacuum as required, heating at 100 to 300° C. for 6 to 24 hours, then adding the P precursor, heating at 200 to 400° C. for several seconds (e.g., two or three seconds) to 60 minutes, and cooling the resulting solution. Next, the core particle-dispersed solution is supplemented with the halogen precursor, heated at 25 to 300° C. for several seconds (e.g., two or three seconds) to 60 minutes, and then cooled down to provide the halogen-added core particle-dispersed solution with the halogen deposited on a portion of the particle surface.

The dispersant is not particularly limited. Examples of the dispersant include carboxylic acids, amines, thiols, phosphines, phosphine oxides, phosphines and phosphonic acids. The dispersant can serve as the solvent. The solvent is not particularly limited. Examples of the solvent include 1-octadecene, hexadecane, squalane, oleylamine, trioctylphosphine and trioctylphosphine oxide. Examples of the additive include the S precursors, the Zn precursors, the halogen precursors described above.

The core particle dispersed solution used at the shell formation step (1) is a dispersed solution in which the core particles are dispersed in a dispersing medium. The dispersing medium to disperse therein the core particles is not particularly limited. Examples of the dispersing medium include 1-octadecene, hexadecane, squalane, squalene, mineral spirits, liquid paraffin, trioctylamine, trioctylphosphine, trioctylphosphine oxide, toluene, hexane and diphenylether. One type of the dispersing medium can be used alone, or two or more types thereof can be used in combination. The dispersing medium is preferably at least one type selected from the group consisting of 1-octadecene, hexadecane, squalane, squalene, mineral spirits and liquid paraffin.

The solution of the zinc branched-chain carboxylate for the shell formation step (1-i) or (1-iii) is a solution in which the zinc branched-chain carboxylate is dissolved in the solvent. The solvent to be used for the solution of the zinc branched-chain carboxylate is not particularly limited. Examples of the solvent to be used for the solution of the zinc branched-chain carboxylate include 1-octadecene, hexadecane, squalane, squalene, mineral spirit, liquid paraffin, trioctylamine, trioctylphosphine, trioctylphosphine oxide, toluene, hexane and diphenyl ether. One type of the solvent can be used alone, or two or more types thereof can be used in combination. The solvent is preferably at least one type selected from the group consisting of 1-octadecene, hexadecane, squalane, squalene, mineral spirits and liquid paraffin.

The solution of the zinc branched-chain carboxylate for the shell formation step (1-i) or (1-iii) is preferably in liquid form at 25° C. and 1 atm. In the case that the solution of the zinc branched-chain carboxylate is in liquid form at 25° C. and 1 atm, the zinc branched-chain carboxylate is prevented from precipitating in supply tubes and clogging the tubes, even when added to the core particle-dispersed solution over a long time. The solution of the zinc branched-chain carboxylate in liquid form at 25° C. and 1 atm refers to no precipitate visually observed in the solution of zinc branched-chain carboxylate after the solution is allowed to stand at 25° C. and 1 atm for 3 hours.

The solution of the group VI element precursor for the shell formation step (1-i) is the solution in which the group VI element precursor is dissolved in the solvent. The solvent to be used for the solution of the group VI element precursor is not particularly limited. Examples of the solvent include 1-octadecene, hexadecane, squalane, squalene, mineral spirits, liquid paraffin, trioctylamine, trioctylphosphine, trioctylphosphine oxide, toluene, hexane and diphenyl ether. The solvent is preferably at least one type selected from the group consisting of 1-octadecene, hexadecane, squalane, squalene, mineral spirit and liquid paraffin.

The solution of the group VI element precursor for the shell formation step (1-i) is preferably in liquid form at 25° C. and 1 atm. In the case that the solution of the group VI element precursor is in liquid form at 25° C. and 1 atm, the group VI element precursor is prevented from precipitating in supply tubes and clogging the tubes, even when added to the core particle-dispersed solution over a long time. The solution of the group VI element precursor in liquid form at 25° C. and 1 atm refers to no precipitate visually observed in the solution of group VI element precursor after the solution is allowed to stand at 25° C. and 1 atm for 3 hours.

The solution of the group VI element precursor(s) including at least the Se element precursor for the shell formation step (1-iii) is a solution in which the VI element precursor(s) is dissolved in the solvent while a part or all of the VI element precursor(s) is the Se precursor. The solvent to be used for the solution of the Se precursor is not particularly limited. Examples of the solvent include 1-octadecene, hexadecane, squalane, squalene, mineral spirits, liquid paraffin, trioctylamine, trioctylphosphine, trioctylphosphine oxide, toluene, hexane and diphenyl ether. The solvent is preferably at least one type selected from the group consisting of 1-octadecene, hexadecane, squalane, squalene, mineral spirit and liquid paraffin.

The solution of the group VI element precursor including at least the Se element precursor for the shell formation step (1-iii) is preferably in liquid form at 25° C. and 1 atm. In the case that the solution of the group VI element precursor including at least the Se element precursor is in liquid form at 25° C. and 1 atm, the group VI element precursor is prevented from precipitating in supply tubes and clogging the tubes, even when the solution of the group VI element precursor including at least the Se element precursor is added to the core particle-dispersed solution over a long time. The solution of the group VI element precursor including at least the Se element precursor in liquid form at 25° C. and 1 atm refers to no precipitate visually observed in the solution of group VI element precursor including at least the Se element precursor after the solution is allowed to stand at 25° C. and 1 atm for 3 hours.

The solution of the zinc branched-chain carboxylate and the group VI element precursor for the shell formation step (1-ii) is the solution in which both of the zinc branched-chain carboxylate and the group VI element precursor are dissolved in the solvent. The solvent to be used for the solution of the zinc branched-chain carboxylate and the group VI element precursor is not particularly limited. Examples of the solvent include 1-octadecene, hexadecane, squalane, squalene, mineral spirits, liquid paraffin, trioctylamine, trioctylphosphine, trioctylphosphine oxide, toluene, hexane and diphenyl ether. One type of the solvent can be used alone, or two or more types thereof can be used in combination. The solvent is preferably at least one type selected from the group consisting of 1-octadecene, hexadecane, squalane, squalene, mineral spirits and liquid paraffin.

The solution of the zinc branched-chain carboxylate and the group VI element precursor for the shell formation step (1-ii) is preferably in liquid form at 25° C. and 1 atm. In the case that the solution of the zinc branched-chain carboxylate and the group VI element precursor is in liquid form at 25° C. and 1 atm, the zinc branched-chain carboxylate or the group VI element precursor is prevented from precipitating in supply tubes and clogging the tubes, even when the solution of the zinc branched-chain carboxylate and the group VI element precursor is added to the core particle-dispersed solution over a long time. The solution of the zinc branched-chain carboxylate and the group VI element precursor in liquid form at 25° C. and 1 atm refers to no precipitate visually observed in the solution of the zinc branched-chain carboxylate and the group VI element precursor after the solution is allowed to stand at 25° C., 1 atm for 3 hours. Since having a lower viscosity than that of the solution of the zinc branched-chain carboxylate alone or the solution of the group VI element precursor alone in many cases, the solution in which both of the zinc branched-chain carboxylate and the group VI element precursor are dissolved in the solvent can be further prevented from causing the problem described above when added to the core particle-dispersed solution.

At the shell formation step (1-i), the phrase "(i) adding the solution of the group VI element precursor while adding the solution of the zinc branched-chain carboxylate to the core particle-dispersed solution" fulfills: "adding the solution of the zinc branched-chain carboxylate to the core particle-dispersed solution continuously or incontinuously at regular or irregular intervals"; "adding the group VI element precursor to the core particle-dispersed solution continuously or incontinuously at regular or irregular intervals"; and "at least partial time period overlap, preferably at least 50% time period overlap, and preferably 80% or more time period overlap between the two: time period starting from the beginning of addition of the solution of the zinc branched-chain carboxylate to the core particle-dispersed solution until the addition is completed; and time period starting from the beginning of addition of the solution of the group VI element precursor to the core particle-dispersed solution until the addition is completed".

There is no particular limitation on the method of continuously adding the solution of the zinc branched-chain carboxylate or the solution of the group VI element precursor to the core particle-dispersed solution. One example of this method is a method of positioning an outlet end of the solution supply tube into the core particle-dispersed solution and continuously supplying the solution of the zinc branched-chain carboxylate or the solution of the group VI element precursor from the solution supply tube. There is no particular limitation on the method of adding the solution of the zinc branched-chain carboxylate or the solution of the group VI element precursor to the core particle-dispersed solution at regular or irregular intervals. Examples of this method include: a method of positioning the outlet end of the solution supply tube above a liquid surface of the core particle-dispersed solution and dropping the solution of the zinc branched-chain carboxylate or the solution of the group VI element precursor from the solution supply tube at regular or irregular intervals; and a method of injecting a predetermined amount of the solution of the zinc branched-chain carboxylate or the solution of the group VI element precursor at regular or irregular intervals.

At the shell formation step (1-i), it is preferred to start the addition of the solution of the zinc branched-chain carboxylate to the core particle-dispersed solution simultaneously with starting the addition of the solution of the group VI element precursor, or to start the addition of the solution of the zinc branched-chain carboxylate to the core particle-dispersed solution prior to starting the addition of the solution of the group VI element precursor, for the reason that only the group VI element precursor will react with the surface of the core particles first to easily form a shell containing the group VI element without Zn if the solution of the group VI element precursor is added to the core particles in the absence of the zinc branched-chain carboxylate nearby.

At the shell formation step (1-ii), the phrase "(ii) adding the solution of the zinc branched-chain carboxylate and the group VI element precursor to the core particle-dispersed solution" refers to dissolving the zinc branched-chain carboxylate and the group VI element precursor into the solvent to prepare the solution first and then adding the solution of the zinc branched-chain carboxylate and the group VI element precursor to the core particle-dispersed solution continuously or incontinuously at regular or irregular intervals.

Examples of a method of preparing the solution of the zinc branched-chain carboxylate and the group VI element precursor first and then adding the solution of the zinc branched-chain carboxylate and the group VI element precursor to the core particle-dispersed solution include: a method of mixing the zinc branched-chain carboxylate with the group VI element precursor in the solvent to prepare the solution of the zinc branched-chain carboxylate and group VI element precursor first and then adding the prepared solution of the zinc branched-chain carboxylate and the group VI element precursor to the core particle-dispersed solution; and a method of adding the solution of the zinc branched-chain carboxylate and the solution of the group VI element precursor to a solution preparation vessel to prepare the solution of the zinc branched-chain carboxylate and the solution of the group VI element precursor inside the solution preparation vessel first and then supplying the solution of the zinc branched-chain carboxylate and the group VI element precursor to the core particle-dispersed solution from the solution preparation vessel.

There is no particular limitation on the method of adding continuously the solution of the zinc branched-chain carboxylate and the solution of the group VI element precursor to the core particle-dispersed solution. One example of this method is a method of positioning the outlet end of the solution supply tube into the core particle-dispersed solution and supplying continuously the solution of the zinc branched-chain carboxylate and the solution of the group VI element precursor from the solution supply tube. There is no particular limitation on the method of adding the solution of the zinc branched-chain carboxylate and the solution of the group VI element precursor to the core particle-dispersed solution at regular or irregular intervals. Examples of this method include: a method of positioning the outlet end of the solution supply tube above liquid surface of the core particle-dispersed solution and dropping the solution of the zinc branched-chain carboxylate and the solution of the group VI element precursor from the solution supply tube at regular or irregular intervals; and a method of injecting predetermined amounts of the solution of the zinc branched-chain carboxylate and the solution of the group VI element precursor at regular or irregular intervals.

At the shell formation step (1-iii), the phrase "(iii) adding the solution of the zinc branched-chain carboxylate and then adding the solution of the group VI element precursor including at least the Se element precursor" refers to adding the whole amount of the solution of the zinc branched-chain carboxylate to the core particle-dispersed solution continuously or incontinuously at regular or irregular intervals, and then adding the whole amount of the solution of the group VI element precursor including at least the Se element precursor continuously or incontinuously at regular or irregular intervals.

There is no particular limitation on the method of consecutively adding the solution of the zinc branched-chain carboxylate or the solution of the group VI element precursor including at least the Se element precursor. One example of this method is positioning the outlet end of the solution supply tube into the core particle-dispersed solution and consecutively supplying the solution of the zinc branched-chain carboxylate or the solution of the group VI element precursor including at least the Se element precursor. There is no particular limitation on the method of adding the solution of the zinc branched-chain carboxylate or the solution of the group VI element precursor including at least the Se element precursor at regular or irregular intervals. Examples of this method include: a method of positioning the outlet end of the solution supply tube above the liquid surface of the core particle-dispersed solution and dropping the solution of the zinc branched-chain carboxylate or the solution of the group VI element precursor including at least the Se element precursor at regular or irregular intervals; and a method of injecting a predetermined amount of the solution of the zinc branched-chain carboxylate or the solution of the group VI element precursor including at least the Se element precursor at regular or irregular intervals.

At the shell formation step (1-iii), it is necessary to add the whole amount of the solution of the zinc branched-chain carboxylate to the core particle-dispersed solution and then add the solution of the group VI element precursor including at least the Se element precursor, for the reason that only the group VI element precursor will react with the surface of the core particles first to easily form the shell containing the group VI element without Zn if the solution of the group VI element precursor including at least the Se element precursor in the absence of the zinc branched-chain carboxylate around them.

At the shell formation step (1), the amount of added zinc branched-chain carboxylate is set such that the molar ratio of Zn to In is preferably 7 to 50, and particularly preferably 10 to 35, in terms of the number of atoms. The above range of the molar ratio of Zn to In achieves high quantum yield, reduced full width at half maximum and reduced Stokes shift.

When only the Se precursor is used as the group VI element precursor at the shell formation step (1), the amount of added Se precursor is set such that the molar ratio of Se to In is preferably 5 to 40, and particularly preferably 5 to 25, in terms of the number of atoms. The above range of the molar ratio of Se to In allows for high quantum yield, reduced full width at half maximum and reduced Stokes shift.

When only the S precursor is used as the group VI element precursor at the shell formation step (1), the amount of added S precursor is set such that the molar ratio of S to In is preferably 5 to 50, particularly preferably 5 to 25, in terms of the number of atoms. The above range of the molar ratio of S to In allows for high quantum yield, reduced full width at half maximum and reduced Stokes shift.

When both of the Se precursor and the S precursor are used as the group VI element precursors at the shell formation step (1), the total amount of Se precursor and S precursor added is set such that the molar ratio of Se and S to In is preferably 5 to 40, particularly preferably 5 to 30, in terms of the number of atoms. The above range of the molar ratio of Se and S to In allows for high quantum yield, reduced full width at half maximum and reduced Stokes shift.

At the shell formation step (1-i) or (1-iii), the solution concentration of the zinc branched-chain carboxylate in the solution of zinc branched-chain carboxylate is preferably 0.01 M to 5.00 M, particularly preferably 0.10 M to 3.00 M. The concentration of the group VI precursor in the solution of the group VI element precursor is preferably 0.01 M to 10.00 M, particularly preferably 0.10 M to 5.00 M.

At the shell formation step (1-ii), the solution concentration of the zinc branched-chain carboxylate in the solution of zinc branched-chain carboxylate and the group VI element precursor is preferably 0.01 M to 5.00 M, particularly preferably 0.10 M to 3.00 M. The concentration of the group VI precursor is preferably 0.01 M to 10.00 M, particularly preferably 0.10 M to 5.00 M.

In the method for producing the core/shell semiconductor nanoparticles of the present invention, the shell containing Zn and the group VI element precursor is formed on the surfaces of the core particles by: the shell formation step (1-i) of (i) adding the solution of the group VI element precursor while adding the solution of the zinc branched-chain carboxylate to the core particle-dispersed solution to allow the zinc branched-chain carboxylate to react with the group VI element precursor in the presence of the core particles; the shell formation step (1-ii) of adding the solution of the zinc branched-chain carboxylate and the group VI element precursor to the core particle-dispersed solution to allow the zinc branched-chain carboxylate to react with the group VI element precursor in the presence of the core particles; or the shell formation step (1-iii) of (iii) adding the solution of the zinc branched-chain carboxylate to the core particle-dispersed solution and then adding the solution of the group VI element precursor including at least the Se element precursor to allow the zinc branched-chain carboxylate to react with the group VI element precursor in the presence of the core particles.

The core particle-dispersed solution is heated preferably at 180 to 320° C., particularly preferably at 250 to 320° C. to allow the zinc branched-chain carboxylate to react with the group VI element precursor, at the shell formation step (1-i) of adding the solution of the group VI element precursor while adding the solution of the zinc branched-chain carboxylate to the core particle-dispersed solution, the shell formation step (1-ii) of adding the solution of the zinc branched-chain carboxylate and the group VI element precursor to the core particle-dispersed solution, or the shell formation step (1-iii) of (iii) adding the solution of the zinc branched-chain carboxylate to the core particle-dispersed solution and adding the solution of the group VI element precursor including at least the Se element precursor. Within the above range of the temperature of the core particle-dispersed solution set when the zinc branched-chain carboxylate is allowed to react with the group VI element precursor, the shell can be formed to prevent the added zinc branched-chain carboxylate and the group VI element precursor from causing non-radiative exciton recombination via defect levels on the core particles, thereby providing the core/shell semiconductor nanoparticles with excellent optical properties.

At the shell formation step (1-i), the time needed for adding the solution of the zinc branched-chain carboxylate to the core particle-dispersed solution is preferably 5 to 600 minutes, particularly preferably 30 to 180 minutes. At the shell formation step (1-ii), the time needed for adding the solution of the zinc branched-chain carboxylate and the group VI element precursor to the core particle-dispersed solution is preferably 5 to 600 minutes, particularly preferably from 30 to 180 minutes. At the shell formation step (1-iii), the time needed for adding the solution of the zinc branched-chain carboxylate to the core particle-dispersed solution is preferably 5 to 600 minutes, particularly preferably 30 to 180 minutes. Within the above range of the time needed for adding the solution of the zinc branched-chain carboxylate or the solution of the zinc branched-chain carboxylate and the group VI element precursor, the added shell precursor can efficiently form the shell on the core particle surfaces.

At the shell formation step (1-i) or (1-iii), the phrase "time needed for adding the solution of the zinc branched-chain carboxylate to the core particle-dispersed solution" refers to the time elapsed from the beginning of adding the solution of the zinc branched-chain carboxylate to the core particle-dispersed solution until the addition is completed. At the shell formation step (1-ii), the phrase "time needed for adding the solution of the zinc branched-chain carboxylate and the group VI element precursor" refers to the time elapsed from the beginning of adding the solution of the zinc branched-chain carboxylate and the group VI element precursor to the core particle-dispersed solution until the addition is completed.

At the shell formation step (1-i), the time needed for adding the solution of the group VI element precursor to the core particle-dispersed solution is preferably 5 to 600 minutes, particularly preferably 30 to 180 minutes. At the shell formation step (1-iii), the time needed for adding the solution of the group VI element precursor including at least the Se element precursor is preferably 5 to 600 minutes, particularly preferably from 30 to 180 minutes. Within the above range of the time needed for adding the solution of the group VI element precursor or the solution of the group VI element precursor including at least the Se element precursor to the particle-dispersed solution, the added shell precursor can efficiently form the shell on the core particle surfaces.

At the shell formation step (1-i), the phrase "time needed for adding the solution of the group VI element precursor to the core particle-dispersed solution" refers to the time elapsed from the beginning of adding the solution of the group VI element precursor to the core particle-dispersed solution until the addition is completed. At the shell formation step (1-iii), the phrase "time needed for adding the solution of the group VI element precursor including at least the Se element precursor" refers to the time elapsed from the beginning of adding the solution of the group VI element precursor including at least the Se element precursor to the core particle-dispersed solution until the addition is completed.

At the shell formation step (1), the reaction of the zinc branched-chain carboxylate with the group VI element precursor can be carried out in the presence of the dispersant. In other words, the dispersant can be present in the core particle-dispersed solution, at the shell formation step (1-i) of adding the solution of the group VI element precursor while adding the solution of the zinc branched-chain carboxylate to the core particle-dispersed solution, the shell formation step (1-ii) of adding the solution of the zinc branched-chain carboxylate and the group VI element precursor to the core particle-dispersed solution, or the shell formation step (1-iii) of adding the solution of the zinc branched-chain carboxylate to the core particle-dispersed solution and adding the solution of the group VI element precursor including at least the Se element precursor. Examples of the dispersant to be present in the core particle-dispersed solution include: amines such as oleylamine and trioctylamine; carboxylic acids such as oleic acid; and thiols such as dodecanethiol. The amount of the dispersant used is selected as appropriate, but preferably 5 to 200 in the molar ratio with respect to In of the core particles, and more preferably 10 to 100 in the molar ratio with respect to In of the core particles.

At the shell formation step (1), the reaction of the zinc branched-chain carboxylate with the group VI element precursor can be carried out in the presence of the halogen precursor. In other words, the halogen precursor can be present in the core particle-dispersed solution, at the shell formation step (1-i) of adding the solution of the group VI element precursor while adding the solution of the zinc branched-chain carboxylate to the core particle-dispersed solution, the shell formation step (1-ii) of adding the solution of the zinc branched-chain carboxylate and the group VI element precursor to the core particle-dispersed solution, or the shell formation step (1-iii) of adding the solution of the zinc branched-chain carboxylate to the core particle-dispersed solution and adding the solution of the group VI element precursor including at least the Se element precursor. The halogen precursor is not particularly limited. Examples of the halogen precursor include HF, HCl, HBr, HI, carboxylic acid halides such as oleyl chloride, oleyl bromide, octanoyl chloride and octanoyl bromide, and metal halides such as zinc chloride, indium chloride and gallium chloride. The amount of the halogen used is selected as appropriate, but preferably 0.3 to 100.0 in the molar ratio with respect to In of the core particles, and more preferably 0.3 to 30.0 in the molar ratio with respect to In of the core particles. At the shell formation step (1-i), the presence of the halogen precursor in the core particle-dispersed solution enables to provide the core/shell semiconductor nanoparticles with the halogen on the surfaces of the core particles or inside the shell layer.

At the shell formation step (1), in addition to the above, carboxylic acids, amines, thiols, phosphines, phosphine oxides, phosphines, phosphonic acids, or the like may be present in the core particle-dispersed solution to allow the zinc branched-chain carboxylate to react with the group VI element precursor.

In the method of producing the core/shell semiconductor nanoparticles of the present invention, it is possible to use the core particles generated by synthesis of the core particles without purification as the core particles used at the shell formation step (1). In other words, the core particles can be used without undergoing the purification step, as the core particles used at the shell formation step (1). In other words, the core particle-dispersed reaction solution obtained after the synthesis of the core particles can be used as the core particles used at the shell formation step (1). At the shell formation step (1), the zinc branched-chain carboxylate is used as the zinc precursor to form the shell layer. Since the zinc branched-chain carboxylate easily reacts with the group VI element precursor on the surfaces of the core particles, the inventors of the present invention presume that impurities in the dispersing medium are prevented from being incorporated in the shell layer and thereby the shell can be formed while preventing the defect level from generating on the core surfaces. Therefore, the core particles without undergoing the purification step can be used as the core particles for the shell formation step (1).

In the method of producing the core/shell semiconductor nanoparticles of the present invention, the zinc branched-chain carboxylate is employed as the zinc precursor used at the shell formation step (1), the zinc branched-chain carboxylate is prevented from precipitating in supply tubes and clogging the tubes, even in the case of adding the solution of the zinc branched-chain carboxylate or the solution of the zinc branched-chain carboxylate and the group VI element precursor to the core particle-dispersed solution over a long time.

The method of producing the core/shell semiconductor nanoparticles according to the present invention is simple because it requires only one-time addition of whole amount of the zinc branched-chain carboxylate and the group VI element precursor used for the shell formation to the core particle-dispersed solution in order to form the shell layer at the shell formation step (1). In the method of producing the core/shell semiconductor nanoparticles according to the present invention, with the use of the zinc branched-chain carboxylate that is added to the core particle-dispersed solution and is used as a group II element precursor to react with the group VI element precursor on the core particle surfaces, it is possible to obtain the core/shell semiconductor nanoparticles with superior optical properties by bringing the whole amounts of the group II element precursor and the group VI element precursor into contact with each other at a time without need for a plurality of alternate steps of bringing the group II element precursor into contact with the group VI element precursor individually. In particular, at the shell formation step (1) in the method of producing the core/shell semiconductor nanoparticles according to the present invention, in the case that the group VI element precursor includes at least the Se precursor, in other words, in the case that the group VI element precursor refers to the Se precursor alone or the combination use of the Se precursor and another group VI element precursor (e.g., S precursor), it is possible to achieve such a highly advantageous effect as to obtain the core/shell semiconductor nanoparticles with superior optical properties by bringing the whole amounts of the group II element precursor and the group VI element precursor into contact with each other at a time. At the shell formation step (1), when at least the Se precursor is included as the group VI element precursor, the ratio of the Se precursor to total of the group VI element precursor(s) in the solution of the group VI element precursor is preferably 50 mol % or more, more preferably 80 mol % or more, still more preferably 90 mol % or more, particularly preferably 100 mol %.

In the method of producing the core/shell semiconductor nanoparticles according to the present invention, the use of shell formation step (1-i) or (1-ii) as the shell formation step achieves such a highly advantageous effect as to narrow the full width at half maximum of the core/shell semiconductor nanoparticles. In particular, in the method of producing the core/shell semiconductor nanoparticles according to the present invention, the use of shell formation step (1-i) or (1-ii) as the shell formation step achieves such a highly advantageous effect as to narrow the full width at half maximum even in the technical field of core/shell semiconductor nanoparticles with narrow full width at half maximum. Due to the difficulty in narrowing the full width at half maximum in the technical field of semiconductor nanoparticles with narrow full width at half maximum, even a small reduction of an absolute value of the full width at half maximum can be deemed advantageous in such a technical field of semiconductor nanoparticles with narrow full width at half maximum.

In the method of producing the core/shell semiconductor nanoparticles according to the present invention, in the case that the shell formation step is the shell formation step (1-iii), the whole amount of the zinc precursor is brought into contact with the core particles first. The use of zinc branched-chain carboxylate as the zinc precursor can inhibit transformation of the core particles and formation of by-products even when the zinc branched-chain carboxylate is added to the core particle-dispersed solution prior to the addition of the group VI element precursor. Therefore, it is possible to efficiently form the shell even when the group VI element precursor is added to subsequent to the addition of the zinc branched-chain carboxylate. Such an advantageous effect can be enhanced when the Se precursor is used as the group VI element precursor, and remarkably enhanced with increase in the scale of reaction system. In this regard, due to low reactivity of the zinc branched-chain carboxylate with the core particle-dispersed solution, even when the zinc branched-chain carboxylate is added to the core particle-dispersed solution before the addition of the Se precursor, the zinc branched-chain carboxylate is dispersed in the dispersant without reacting with the core particles. The subsequent addition of the Se precursor is presumably followed by preferential reaction involving the zinc branched-chain carboxylate, the Se precursor and the core particles and coating surfaces of the core particles preferentially in the core particle-dispersed solution to initiate the formation (growth) of the ZnSe shell. In consideration of uneven distribution of the precursor that is easily caused in the shell formation with increase in the scale of reaction system, the step of adding the zinc branched-chain carboxylate first and then adding the Se precursor enables the preferential reaction involving the zinc branched-chain carboxylate, the Se precursor and the core particles so as to undergo the process involving the growth of the ZnSe shell. In this way, it is possible to prevent unevenness of shell formation resulting from the uneven distribution of the precursor that is generally caused easily at the mass production level, at the shell formation step (1-iii). Therefore, with the shell formation step (1-iii), the method of producing the core/shell semiconductor nanoparticles of the present invention can produce the core/shell semiconductor nanoparticles with excellent optical properties at the mass production level, compared to the case of adding whole amount of the solution of zinc branched-chain carboxylate to the core particle-dispersed solution and then adding whole amount of the solution containing only the S precursor as the group VI element precursor.

By comparing the optical properties of the semiconductor nanoparticles obtained by using the S precursor to the optical properties of the semiconductor nanoparticles obtained by using the Se precursor, which are both the group VI elements, at the shell formation step (1), the semiconductor nanoparticles obtained by using the Se precursor exhibit remarkably higher optical properties. This presumably results from the difference between the Se precursor and the S precursor in the reactivity of the group VI element with the zinc branched-chain carboxylate and the core particles.

In the method of producing the core/shell semiconductor nanoparticles of the present invention, on the surfaces of the core/shell semiconductor nanoparticles obtained at the shell formation step (1), i.e., the shell formation step (1-i), the shell formation step (1-ii) or the shell formation step (1-iii), a branched-chain carboxylic acid(s) derived from the zinc branched-chain carboxylate used as the zinc precursor at the shell formation step (1) is/are coordinated. The branched-chain carboxylic acid(s) coordinated to the surfaces of the core/shell semiconductor nanoparticles act as a ligand(s) that enhance(s) the dispersibility of the core/shell semiconductor nanoparticles in the dispersing medium. For example, when zinc 3,5,5-trimethylhexanoate is used as the zinc precursor at the shell formation step (1), 3,5,5-trimethylhexanoic acid is coordinated as the ligand on the surfaces of the resulting core/shell semiconductor nanoparticles. The coordination described here refers to the chemical influence of the ligand on the surfaces of the core/shell semiconductor nanoparticles. The ligand may be bound to the surfaces of the core/shell semiconductor nanoparticles by a coordination bond(s) or any other bond (e.g., covalent bond, ionic bond, hydrogen bond or the like). When the ligand is present on at least a part of the surfaces of the core/shell semiconductor nanoparticles, the bonding is not necessarily formed.

In the method of producing the core/shell semiconductor nanoparticles of the present invention, subsequent to the shell formation step (1), i.e., the shell formation step (1-i), the shell formation step (1-ii) or the shell formation step (1-iii), the formed core/shell structured particles may be obtained as the core/shell semiconductor particles for the target product. Furthermore, with use of the formed core/shell structured particles, the core/shell semiconductor nanoparticles with two or more shell layers may be obtained by performing one or more times of the shell formation step(s). In other words, the method of producing the core/shell semiconductor nanoparticles of the present invention may have one or more shell formation step(s) to form a shell on the core/shell type particles containing zinc and the group VI element obtained by performing the shell formation step (1), in addition to the shell formation step (1). The same type of method as the above shell formation step (1) can be applied to the one or more times of the shell formation step(s). In other words, the shell formation step can be performed in the same way as the shell formation step (1), except that core/shell type particles with one or more shell layers formed on the surface of the core particles are used instead of the core particles. The one or more times of the shell formation step(s) may be (an) other step(s) different from the above shell formation step (1).

Regarding examples of the method of producing the core/shell semiconductor nanoparticles in which two layered shells are formed on the surfaces of the core particles, one example is a method of producing the core/shell semiconductor nanoparticles including (1) the shell formation step and (2) any one of the following steps (i) through (iii) of adding to a dispersed solution in which "particles each composed of the core particle and one layered shell formed on the surface of the core particle" are dispersed as a result of performing the shell formation step (1): (i) adding the solution of the group VI element precursor while adding the solution of the zinc branched-chain carboxylate; (ii) adding the solution of the zinc branched-chain carboxylate and the group VI element precursor; and (iii) adding the solution of the zinc branched-chain carboxylate and then adding the solution of the group VI element precursor including at least the Se precursor, in order to achieve the reaction between the zinc branched-chain carboxylate and the group VI element precursor in the presence of the "particles each composed of the core particle and one layered shell formed on the surface of the core particle" for the purpose of forming the shell containing Zn and the group VI element on the surfaces of the "particles each composed of the core particle and one layered shell formed on the surface of the core particle".

In the method of producing the core/shell semiconductor nanoparticles of the present invention, when one or more times of the shell formation step is performed after the above shell formation step (1) is performed, on the surfaces of the core/shell semiconductor nanoparticles obtained by the method of producing the core/shell semiconductor nanoparticles of the present invention, the branched-chain carboxylic acid(s) derived from the zinc branched-chain carboxylate used as the zinc precursor at the shell formation step (1) is/are coordinated. The branched-chain carboxylic acid(s) coordinated to the surfaces of the core/shell semiconductor nanoparticles act as the ligand(s) that enhance(s) the dispersibility of the core/shell semiconductor nanoparticles in the dispersing medium.

Regarding examples of the method of producing the core/shell semiconductor nanoparticles in which (n+1)-layered shells are formed on the surfaces of the core particles, one example is a method of producing the core/shell semiconductor nanoparticles including (1) the shell formation step and n-times repeated shell formation steps (x) each involving any one of the following steps (i) through (iii) of adding to a dispersed solution in which "particles each composed of the core particle and one or more layered shell formed on the surface of the core particle" are dispersed as a result of performing the preceding shell formation step (1): (i) adding the solution of the group VI element precursor while adding the solution of the zinc branched-chain carboxylate; (ii) adding the solution of the zinc branched-chain carboxylate and the group VI element precursor; and (iii) adding the solution of the zinc branched-chain carboxylate and then adding the solution of the group VI element precursor including at least the Se precursor, in order to achieve the reaction between the zinc branched-chain carboxylate and the group VI element precursor in the presence of the "particles each composed of the core particle and one or more layered shell formed on the surface of the core particle", for the purpose of forming the shell containing Zn and the group VI element on the surfaces of the "particles each composed of the core particle and one or more layered shell formed on the surface of the core particle".

In the method of producing the core/shell semiconductor nanoparticles of the present invention, when one or more times of the shell formation step (x) is repeatedly performed after the above shell formation step (1) is performed, on the surfaces of the core/shell semiconductor nanoparticles obtained by the method of producing the core/shell semiconductor nanoparticles of the present invention, the branched-chain carboxylic acid(s) derived from the zinc branched-chain carboxylate used as the zinc precursor at the shell formation step (1) and the shell formation step (x) is/are coordinated. The branched-chain carboxylic acid(s) coordinated to the surfaces of the core/shell semiconductor nanoparticles act as the ligand(s) that enhance(s) the dispersibility of the core/shell semiconductor nanoparticles in the dispersing medium.

In the method of producing the core/shell semiconductor nanoparticles according to the present invention, it is possible to purify the core/shell semiconductor nanoparticles produced by performing the shell formation step. For example, the core/shell semiconductor nanoparticles can be deposited from the solution by addition of an umpolung solvent such as acetone. The deposited core/shell semiconductor nanoparticles can then be collected by filtration or centrifugal separation. The filtrate or supernatant solution containing unreacted starting materials and other impurities can be reused. The recovered semiconductor nanoparticles can then be washed with another solvent and dissolved again. This purification operation can be repeated, for example, two to four times, or until the desired purity is achieved. Examples of other purification methods include flocculation, liquid-liquid extraction, distillation, electrodeposition, size exclusion chromatography, and ultrafiltration. For the purification, one type of the purification method can be employed, or two or more types thereof can be employed in combination.

An oxide layer can be formed on the surface of the core/shell semiconductor nanoparticles by adding a surfactant to the core/shell semiconductor nanoparticles obtained as described above, stirring, then adding an inorganic composition, and stirring again. The surfactant is not particularly limited. Examples of the surfactant include sodium dodecyl sulfate, sodium lauryl sulfate, n-butanol and dioctylsodium sulfosuccinate. The inorganic composition is not particularly limited. Examples of the inorganic composition include silane coupling agents, titanate coupling agents and aluminate coupling agents. For example, after purification of the core/shell semiconductor nanoparticles, an aqueous solution containing the surfactant is added, and the mixed solution is mixed and stirred to form micelles. The micelle formation is confirmed by the cloudiness of the mixture solution. After collected, an aqueous phase in which the micelles are formed is supplemented with the inorganic composition and then stirred at 10 to 30° C. for 10 minutes to 6 hours. After removing unreacted materials, the product is purified again to obtain the core/shell semiconductor nanoparticles with oxide layers. The method of forming the outermost layer of oxide is not limited to the above methods, and may be a method of adding the inorganic composition during the shell synthesis, for example, or any of other well-known methods.

Furthermore, the surface of the core/shell semiconductor nanoparticles obtained as described above may be modified with a ligand(s). Any of well-known methods of modifying ligands, such as ligand-exchange method, can be used.

The core/shell semiconductor nanoparticles obtained by the method of producing the core/shell semiconductor nanoparticles according to the present invention refer to core/shell structured particles each having at least one-layered shell layer. In the core/shell semiconductor nanoparticles obtained by the method of producing the core/shell semiconductor nanoparticles according to the present invention, the shell layer formed on the surface of the core particles, i.e., the first shell layer viewed from the core particle side, is the shell layer formed by performing the shell formation step (1). In the core/shell semiconductor nanoparticles obtained by the method for producing the core/shell semiconductor nanoparticles according to the present invention, the number of shell layers formed is at least one, and preferably one to four. When the core/shell semiconductor nanoparticle obtained by the method for producing core/shell semiconductor nanoparticles according to the present invention has two or more shell layers, any method may be employed to form the second and subsequent shell layers viewed from the core particle. However, it is preferred to employ the shell formation method including the same step as the shell layer formation step (1), except that core/shell-typed particle with one or more layered shell layer is formed at the preceding shell layer formation step as an object for the shell layer formation instead of core particles.

In the core/shell semiconductor nanoparticles obtained by the method for producing core/shell semiconductor nanoparticles according to the present invention, the core preferably refers to a core containing In and P. In the core/shell semiconductor nanoparticles obtained by the method for producing core/shell semiconductor nanoparticles according to the present invention, the molar ratio of P to In in terms of the number of atoms is 0.20 to 1.20, preferably 0.20 to 0.95, more preferably 0.40 to 0.95. The above range of the molar ratio of P to In achieves high quantum yield, reduced full width at half maximum and reduced Stokes shift.

In the core/shell semiconductor nanoparticles obtained by the method for producing core/shell semiconductor nanoparticles according to the present invention, the molar ratio of Zn to In in terms of the number of atoms is preferably 11.00 to 50.00, particularly preferably 12.00 to 30.00. The above range of the molar ratio of Zn to In achieves high quantum yield, reduced full width at half maximum and reduced Stokes shift.

In the core/shell semiconductor nanoparticles obtained by the method for producing core/shell semiconductor nanoparticles according to the present invention, the molar ratio of Se to In in terms of the number of atoms is preferably 7.00 to 25.00, particularly preferably 11.00 to 20.00. The above range of the molar ratio of Se to In allows for high quantum yield, reduced full width at half maximum and reduced Stokes shift.

In the core/shell semiconductor nanoparticles obtained by the method for producing core/shell semiconductor nanoparticles according to the present invention, the molar ratio of S to In in terms of the number of atoms is preferably 0.00 to 45.00, particularly preferably 0.00 to 30.00. The above range of the molar ratio of S to In allows for high quantum yield, reduced full width at half maximum and reduced Stokes shift.

In the core/shell semiconductor nanoparticles obtained by the method for producing core/shell semiconductor nanoparticles according to the present invention, the molar ratio of the halogen to In in terms of the number of atoms is preferably 0.80 to 15.00, particularly preferably 1.00 to 15.00. The above range of the molar ratio of the halogen to In achieves a high quantum yield small full width at half maximum, and reduced Stokes shift. When two or more types of the halogen are contained in the core/shell semiconductor nanoparticles obtained by the method for producing core/shell semiconductor nanoparticles according to the present invention, the above molar ratio of the halogen to In refers to the ratio of total moles of two or more types of the halogen to the mole of In.

There is no particular limitation on the average particle size of the core/shell semiconductor nanoparticles obtained by the method for producing core/shell semiconductor nanoparticles according to the present invention. This average particle size is preferably 1.0 to 20.0 nm, and particularly preferably 1.0 to 10.0 nm.

In the core/shell semiconductor nanoparticles obtained by the method for producing core/shell semiconductor nanoparticles according to the present invention, at least a branched chain carboxylic acid is coordinated as the ligand to the core/shell semiconductor nanoparticles. When the core/shell semiconductor nanoparticle is modified with the ligand, the ligand other than the branched chain carboxylic acid may be coordinated to the core/shell semiconductor nanoparticles. The core/shell semiconductor nanoparticles obtained by the method for producing core/shell semiconductor nanoparticles according to the present invention refer to a core/shell semiconductor nanoparticle composite including the core/shell semiconductor nanoparticles and the ligand coordinated to the surface of the core/shell semiconductor nanoparticles, and contain at least branched chain carboxylic acid as the ligand. In the core/shell semiconductor nanoparticles obtained by the method of producing core/shell semiconductor nanoparticles according to the present invention, the shell contains at least Zn and Se.

That is, the core/shell semiconductor nanoparticle composite of the present invention is a core/shell semiconductor nanoparticle composite including the core/shell semiconductor nanoparticle and the ligand coordinated to the surface of the core/shell semiconductor nanoparticle, in which
the shell contains at least Zn and Se, and
the branched chain carboxylic acid is contained as the ligand.

The core/shell semiconductor nanoparticle composite of the present invention contains at least the branched chain carboxylic acid as the ligand. The core/shell semiconductor nanoparticle composite of the present invention can contain the ligand other than the branched chain carboxylic acid, as required. The core/shell semiconductor nanoparticle composite of the present invention contains the branched chain carboxylic acid ligand at a molar fraction of preferably 20.0 to 80.0 mol %, particularly preferably 20.0 to 60.0 mol %, with respect to that of all ligands coordinated to the core/shell semiconductor nanoparticle.

In the core/shell semiconductor nanoparticle composite of the present invention, examples of the branched chain carboxylic acid coordinated to the core/shell semiconductor nanoparticle include carboxylic acids each having a hydrocarbon main chain and a branched chain(s) branched from the main chain. The branched chain carboxylic acid is preferably 2-ethylhexanoic acid, 3,5,5-trimethylhexanoic acid or 16-methylheptadecanoic acid.

In the core/shell semiconductor nanoparticle composite of the present invention, the shell precursor easily reacts on the surfaces of the core particles at the shell formation step, allowing the shell with reduced generation of defect levels to be formed on the core surface. Therefore, the full width at half maximum (FWHM) of the emission spectrum of the core/shell semiconductor nanoparticle composite of the present invention is preferably 35 nm or less, and particularly preferably 33 nm or less. The quantum yield (QY) of the core/shell semiconductor nanoparticle composite of the present invention is preferably 80% or more, and particularly preferably 83% or more.

The core/shell semiconductor nanoparticle pertaining to the core/shell semiconductor nanoparticle composite of the present invention, i.e., the core/shell semiconductor nanoparticle to which the ligand is coordinated, is a particle with a core/shell structure having at least one shell layer. In the core/shell semiconductor nanoparticle pertaining to the core/shell semiconductor nanoparticle composite of the present invention, the shell layer formed on the surface of the core particle, i.e., the first shell layer viewed from the core particle side contains at least Zn and Se. In the core/shell semiconductor nanoparticle pertaining to the core/shell semiconductor nanoparticle composite of the present invention, the number of shell layers formed is at least one, and preferably one to four. When the core/shell semiconductor nanoparticle pertaining to the core/shell semiconductor nanoparticle composite of the present invention has two or more shell layers, the second and subsequent shell layers viewed from the core particle preferably contain Zn and the group VI element, and particularly preferably Zn and either one of Se and S.

In the core/shell semiconductor nanoparticle pertaining to the core/shell semiconductor nanoparticle composite of the present invention, the core preferably refers to the core containing In and P. In the core/shell semiconductor nanoparticle composite of the present invention, the molar ratio of P to In is 0.20 to 1.20, preferably 0.20 to 0.95, and more preferably 0.40 to 0.95, in terms of the number of atoms. The above range of the molar ratio of P to In achieves high quantum yield, reduced full width at half maximum and reduced Stokes shift.

In the core/shell semiconductor nanoparticle pertaining to the core/shell semiconductor nanoparticle composite of the present invention, the molar ratio of Zn to In in terms of the number of atoms is 11.00 to 50.00, particularly preferably 12.00 to 30.00. The above range of the molar ratio of Zn to In achieves high quantum yield, reduced full width at half maximum and reduced Stokes shift.

In the core/shell semiconductor nanoparticle pertaining to the core/shell semiconductor nanoparticle composite of the present invention, the molar ratio of Se to In in terms of the number of atoms is 7.00 to 25.00, and particularly preferably 11.00 to 20.00. The above range of the molar ratio of Se to In allows for high quantum yield, reduced full width at half maximum and reduced Stokes shift.

In the core/shell semiconductor nanoparticle pertaining to the core/shell semiconductor nanoparticle composite of the present invention, the molar ratio of S to In in terms of the number of atoms is 0.00 to 45.00, and particularly preferably 0.00 to 30.00. The above range of the molar ratio of S to In allows for high quantum yield, reduced full width at half maximum and reduced Stokes shift.

In the core/shell semiconductor nanoparticle pertaining to the core/shell semiconductor nanoparticle composite of the present invention, the molar ratio of the halogen to In in terms of the number of atoms is 0.80 to 15.00, and particularly preferably 1.00 to 15.00. The above range of the molar ratio of the halogen to In achieves a high quantum yield, small full width at half maximum, and reduced Stokes shift. When the core/shell semiconductor nanoparticle pertaining to the core/shell semiconductor nanoparticle composite of the present invention contain two or more types of the halogen, the above molar ratio of the halogen to In refers to the ratio of total moles of two or more types of the halogen to the mole of In.

<Measurement>

Elemental analysis can be performed for the semiconductor nanoparticles using a high-frequency inductively coupled plasma atomic emission spectrometer (ICP) or X-ray fluorescence spectrometer (XRF). In the ICP measurement, the purified semiconductor nanoparticles are dissolved in nitric acid, heated, diluted with water and used for the measurement with an ICP emission spectrometer (manufactured by Shimadzu Corporation, ICPS-8100) by means of calibration curve method. In the XRF measurement, the dispersed solution is impregnated on a filter paper and placed in a sampling holder for quantitative analysis using an X-ray fluorescence spectrometer (manufactured by Rigaku Corporation, ZSX100e).

The optical properties can be identified for the semiconductor nanoparticles by the measurement using a fluorescence quantum yield measurement system (manufactured by Otsuka Electronics Co., Ltd., QE-2100) and an ultraviolet visible spectrophotometer (manufactured by JASCO Corporation, V670). Excitation light is applied to the dispersed solution in which the semiconductor nanoparticles are dispersed in the dispersing medium, in order to obtain an emission spectrum. The emission spectrum obtained is corrected by subtraction of a luminescence emission spectrum obtained as a result of luminescence by re-excitation, and then used for calculations of peak wavelength (Xmax), fluorescence quantum yield (QY) and full width at half maximum (FWHM). Examples of the dispersing medium include normal hexane, octadecene, toluene, acetone and PGMEA. The excitation light used for the measurement is a single light with 450 nm. The dispersed solution is prepared for use by controlling the concentration of semiconductor nanoparticles to achieve an absorption ratio of 20 to 30%. The absorption spectrum can be measured by irradiating UV-visible light to the dispersed solution in which the semiconductor nanoparticles are dispersed in the dispersing medium.

Gas chromatography can be used to identify the type and calculate the mole fraction for the ligand coordinated to the core/shell semiconductor nanoparticles. The core/shell semiconductor nanoparticles are introduced into a sample vaporization chamber, heated to 350° C. or more, injected through a column together with a carrier gas to provide a signal at a detector. The type and quantity of each ligand can be determined by retention times and peak areas from the signal. The type and quantity determined for each ligand can be used for determinations of the presence and type of the ligand(s) coordinated to the core/shell semiconductor nanoparticles and calculation of the content ratio thereof.

The configurations, methods, procedures, processes and the like described in this specification are illustrated as examples, and do not apply any limitation on the present invention. Numerous modifications are applicable within the scope of the present invention.

The present invention is described below with reference to specific experimental examples, but the present invention is not limited to these examples.

EXAMPLE

Semiconductor nanoparticles were prepared according to the following method. Then, compositions and optical properties were measured for the semiconductor nanoparticles obtained.

<Core Particle Synthesis>

Indium acetate (0.5 mmol), myristic acid (1.5 mmol), zinc myristate (0.2 mmol) and octadecene (10 mL) were put into a two-necked flask, the flask was vacuumed and heated to 120° C. under vacuum (<10 Pa). After vacuumed to a degree of vacuum less than 10 Pa, the flask was held for 30 minutes. Next, nitrogen was introduced into the flask. Then, the flask was cooled down to room temperature (25° C.) to provide an In precursor.

Tris(trimethylsilyl)phosphine was mixed with tri-n-octylphosphine to a molar concentration of 0.2 M in a glove box under a nitrogen atmosphere to obtain a P precursor.

Next, 2 mL of the P precursor was injected to the In precursor at room temperature (25° C.) under a nitrogen atmosphere, and the temperature was increased to 280° C. at 30° C./min. After held at 280° C. for 2 minutes, the reaction solution was cooled down to room temperature to provide the reaction solution as a InP core particle-dispersed solution.

<Solution of Zinc Precursor>

Zinc carboxylate and octadecene listed in Table 1 were mixed with each other to a zinc molar concentration of 0.3 M. Vacuuming was carried out at 100° C. for 1 hour. Then, nitrogen was introduced for nitrogen replacement and cooled down to room temperature (25° C.) to provide solutions of zinc precursors listed in Table 1.

<Se Precursor Solution> 100 mmol of selenium powder was mixed with 50 mL of tri-n-octylphosphine under a nitrogen atmosphere, the mixture was stirred until the selenium powder was completely dissolved to provide a solution of Se precursor.

<S Precursor Solution>.

100 mmol of sulfur powder was mixed with 50 mL of tri-n-octylphosphine under a nitrogen atmosphere, the mixture was stirred until the sulfur powder was completely dissolved to provide a solution of S precursor.

<Production of Core/Shell Semiconductor Nanoparticle>

Example 1

To 10 mL (In: 0.4 mmol) of the InP core particle-dispersed solution, 5 mL of trioctylamine was added, and the temperature of the InP core particle-dispersed solution was raised to 230° C. Next, once the temperature of the InP core particle-dispersed solution reached 230° C., 20 mL of the solution of zinc precursor listed in Table 1 and 2.0 mL of the solution of Se precursor were added within one minute, and the temperature of the InP core particle-dispersed solution increased to 280° C. at 1° C./minute. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

Next, acetone was added to the resulting core/shell semiconductor nanoparticle-dispersed solution to aggregate the semiconductor nanoparticles. Next, the supernatant was then removed after centrifugation (4000 rpm, 10 min) and the core/shell semiconductor nanoparticles were re-dispersed in hexane. This was repeated to obtain purified core/shell semiconductor nanoparticles.

The optical properties were measured for the resulting core/shell semiconductor nanoparticles. The results are listed in Table 2.

In the measurement of optical properties of semiconductor nanoparticles, the excitation wavelength was a single wavelength of 450 nm. The same is applied to the following measurement of optical properties of the semiconductor nanoparticles.

Example 2

To 10 mL (In: 0.4 mmol) of the InP core particle-dispersed solution, 5 mL of trioctylamine was added, and the temperature of the InP core particle-dispersed solution was raised to 230° C. Next, once the temperature of the InP core particle-dispersed solution reached 230° C., addition of the solution of zinc precursor listed in Table 1 and addition of the solution of Se precursor were started simultaneously at 0.4 mL/minute and 0.04 mL/minute, respectively. Both of the additions were stopped 50 minutes after the beginning of the additions of the solution of zinc precursor and the solution of Se precursor (addition time: 50 minutes). The rising temperature of the InP core particle dispersed solution up to 280° C. at 1° C./min was started simultaneously when the additions of the solution of zinc precursor and the solution of Se precursor were started. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

The optical properties were measured for the resulting core/shell semiconductor nanoparticles. The results are listed in Table 2.

Example 3

A solutions of zinc and Se precursors was prepared by mixing the solution of zinc precursor and the solution of Se precursor listed in Table 1 at a volume ratio of 10:1.

To 10 mL (In: 0.4 mmol) of the InP core particle-dispersed solution, 5 mL of trioctylamine was added, and the temperature of the InP core particle-dispersed solution was raised to 230° C. Then, once the InP core particle dispersed solution reached 230° C., the addition of the solution of zinc precursor and Se precursor was started at a rate of 0.44 mL/min. The addition was stopped 50 minutes after the beginning of the addition of the solution of zinc precursor and Se precursor (addition time: 50 minutes). The rising temperature of the InP core particle dispersed solution up to 280° C. at 1° C./min was started simultaneously when the addition of the solution of zinc precursor and Se precursor was started. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

The optical properties were measured for the resulting core/shell semiconductor nanoparticles. The results are listed in Table 2.

Example 4

A solutions of zinc and Se precursors was prepared by mixing the solution of zinc precursor and the solution of Se precursor listed in Table 1 at a volume ratio of 10:1.

To 10 mL (In: 0.4 mmol) of the InP core particle-dispersed solution, 5 mL of trioctylamine was added, and the temperature of the InP core particle-dispersed solution was raised to 230° C. Next, 0.2 mmol of oleoyl chloride was added to the InP core particle dispersed solution, and the solution obtained was left to stand at 230° C. for 30 minutes. Then, to the InP core particle dispersed solution, the addition of the solution of zinc precursor and Se precursor was started at a rate of 0.44 mL/min. The addition was stopped 50 minutes after the beginning of the addition of the solution of zinc precursor and Se precursor (addition time: 50 minutes). The rising temperature of the InP core particle dispersed solution up to 280° C. at 1° C./min was started simultaneously when the addition of the solution of zinc precursor and Se precursor was started. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

Gas chromatography measurement was performed to identify the type of ligands coordinating to the resulting core/shell semiconductor nanoparticles and determine the mole fraction of each ligand, revealing that 3,5,5-trimethylhexanoic acid accounts for 43.6 mol % of the all ligands coordinated to the obtained core/shell semiconductor nanoparticles.

The optical properties were measured for the resulting core/shell semiconductor nanoparticles. The results are listed in Table 2.

Example 5

The process was the same as in Example 4, except that the zinc precursors listed in Table 1 were used as the zinc precursor.

Gas chromatography measurement was performed to identify the type of ligands coordinating to the resulting core/shell semiconductor nanoparticles and determine the mole fraction of each ligand, revealing that 2-ethylhexanoic acid accounts for 41.7 mol % of all ligands coordinated to the obtained core/shell semiconductor nanoparticles.
  i. The optical properties were measured for the resulting core/shell semiconductor nanoparticles. The results are listed in Table 2.

Example 6

The process was the same as in Example 4, except that the zinc precursors listed in Table 1 were used as the zinc precursor. The results are listed in Table 2.

Example 7

The solution of zinc precursor listed in Table 1 was mixed with the solution of Se precursor and the solution of S precursor at a volume ratio of 10:0.5:0.5 for preparation of a solution of the zinc precursor, the Se precursor and the S precursor.

To 10 mL (In: 0.4 mmol) of the InP core particle-dispersed solution, 5 mL of trioctylamine was added, and the temperature of the InP core particle-dispersed solution was raised to 200° C. Next, 0.2 mmol of oleoyl chloride was added to the InP core particle dispersed solution, and the solution obtained was left to stand at 230° C. for 30 minutes. Then, to the InP core particle dispersed solution, the addition of the solution of zinc precursor, and Se precursor and S precursor was started at a rate of 0.44 mL/min. The addition was stopped 50 minutes after the beginning of the addition of the solution of zinc precursor, Se precursor and S precursor (addition time: 50 minutes). The rising temperature of the InP core particle dispersed solution up to 280° C. at 1° C./min was started simultaneously when the addition of the solution of zinc precursor, Se precursor and S precursor was started. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

The optical properties were measured for the resulting core/shell semiconductor nanoparticles. The results are listed in Table 2.

Example 8

The process was the same as in Example 7, except that: the solution of zinc precursor listed in Table 1 was mixed with the solution of Se precursor and the solution of S precursor at a volume ratio of 10:1.0:1.0 for preparation of the solution of the zinc precursor, the Se precursor and the S precursor; and the solution of the zinc precursor, the Se precursor and the S precursor was added at 0.48 mL/minute. The addition time was 50 minutes. The results are listed in Table 2.

Example 9

The process was the same as in Example 7, except that the solution of the zinc precursor, the Se precursor and the S precursor was added at 0.84 mL/minute. The addition time was 50 minutes. The results are listed in Table 2.

Example 10

A solutions of zinc and Se precursors was prepared by mixing the solution of zinc precursor and the solution of Se precursor listed in Table 1 at a volume ratio of 10:1.

To 10 mL (In: 0.4 mmol) of the InP core particle-dispersed solution, 5 mL of trioctylamine was added, and the temperature of the InP core particle-dispersed solution was raised to 230° C. Next, 0.2 mmol of oleoyl chloride was added to the InP core particle dispersed solution, and the solution obtained was left to stand at 230° C. for 30 minutes. Then, to the InP core particle dispersed solution, the addition of the solution of zinc precursor and Se precursor was started at a rate of 0.22 mL/min. The addition was stopped 100 minutes after the beginning of the addition of the solution of zinc precursor and Se precursor (addition time: 100 minutes). The rising temperature of the InP core particle dispersed solution up to 250° C. at 0.5° C./min was started simultaneously when the addition of the solution of zinc precursor and Se precursor was started. Once the temperature reached 250° C., the temperature of the InP core particle dispersed solution raised up to 280° C. at 1° C./min. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

The optical properties were measured for the resulting core/shell semiconductor nanoparticles. The results are listed in Table 2.

Example 11

A solutions of zinc and Se precursors was prepared by mixing the solution of zinc precursor and the solution of Se precursor listed in Table 1 at a volume ratio of 10:1.

To 10 mL (In: 0.4 mmol) of the InP core particle-dispersed solution, 5 mL of trioctylamine was added, and the temperature of the InP core particle-dispersed solution was raised to 230° C. Next, 0.2 mmol of oleoyl chloride was added to the InP core particle dispersed solution, and the solution obtained was left to stand at 230° C. for 30 minutes. Then, to the InP core particle dispersed solution, the addition of the solution of zinc precursor and Se precursor was started at a rate of 0.055 mL/min. The addition was stopped 400 minutes after the beginning of the addition of the solution of zinc precursor and Se precursor (addition time: 400 minutes). The rising temperature of the InP core particle dispersed solution up to 250° C. at 0.125° C./min was started simultaneously when the addition of the solution of zinc precursor and Se precursor was started. Once the temperature reached 250° C., the temperature of the InP core particle dispersed solution raised up to 280° C. at 1° C./min. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

The optical properties were measured for the resulting core/shell semiconductor nanoparticles. The results are listed in Table 2.

Example 12

The process was the same as in Example 4, except that the solvent for the zinc precursor solution was squalene instead of octadecene. The addition time was 50 minutes. The results are listed in Table 2.

Comparative Example 1

The process was the same as in Example 1, except that the zinc precursor was a zinc carboxylate listed in Table 1. The results are listed in Table 2.

Comparative Example 2

The process was the same as in Example 2, except that the zinc precursor was the zinc carboxylate listed in Table 1. In Comparative Example 2, the zinc precursor solution caused clogging of a supply tube multiple times while added, and thereby was supplied together with the Se precursor solution after eliminating the clogging problem each time. The results are listed in Table 2.

Comparative Example 3

The process was the same as in Example 4, except that the zinc precursor was the zinc carboxylate listed in Table 1. In Comparative Example 4, the zinc precursor solution and the Se precursor solution caused clogging of the supply tubes multiple times while added, and thereby was supplied after eliminating the clogging problem each time. The results are listed in Table 2.

<Production of Core/Shell/Shell Semiconductor Nanoparticles>

Examples 1 to 12 and Comparative Examples 1 to 3

The core/shell semiconductor nanoparticle dispersed solution (reaction solution) was obtained in the same way as in the above Examples and Comparative examples. The core/shell semiconductor nanoparticle dispersed solution (reaction solution) obtained was heated to 280° C. Next, once the temperature reached 280° C., to the core/shell semiconductor nanoparticle dispersed solution (reaction solution), the addition of the solution of zinc precursor listed in Table 1 and the addition of the solution of S precursor were started simultaneously at rates of 0.2 mL/min and 0.03 mL/min, respectively. The additions were stopped 100 minutes after the beginning of the additions of the solution of zinc precursor and the solution of S precursor (addition time: 100 minutes). Next, the heating was stopped 60 minutes after the additions were completed. The solution was cooled down to room temperature (25° C.) to provide a core/shell/shell semiconductor nanoparticle-dispersed solution (reaction solution).

Next, acetone was added to the resulting core/shell/shell semiconductor nanoparticle-dispersed solution to aggregate the semiconductor nanoparticles. Next, the supernatant was then removed after centrifugation (4000 rpm, 10 min) and the core/shell/shell semiconductor nanoparticles were re-dispersed in hexane. This was repeated to obtain purified core/shell/shell semiconductor nanoparticles.

The optical properties were measured for the resulting core/shell/shell semiconductor nanoparticles. The results are listed in Table 2.

<Production of Core/Shell Semiconductor Nanoparticles on a Large Scale>

Example 13

(Preparation of InP Core Particle Dispersed Solution)

Indium acetate (50 mmol), myristic acid (150 mmol), zinc myristate (20 mmol) and octadecene (1000 mL) were put into the two-necked flask, the flask was vacuumed and heated to 120° C. under vacuum (<10 Pa). After vacuumed to a degree of vacuum less than 10 Pa, the flask was held for 60 minutes. Next, nitrogen was introduced into the flask. Then, the flask was cooled down to room temperature (25° C.) to provide an In precursor.

Tris(trimethylsilyl)phosphine was mixed with tri-n-octylphosphine to a molar concentration of 0.2 M in a glove box under a nitrogen atmosphere to obtain a P precursor.

Next, 200 mL of the P precursor was injected to the In precursor at room temperature (25° C.) under the nitrogen atmosphere, and the temperature was increased to 280° C. at 10° C./min. After held at 280° C. for 2 minutes, the reaction solution was cooled down to room temperature to provide the reaction solution as the InP core particle-dispersed solution.

(Production of Core/Shell Semiconductor Nanoparticles)

Next, the solution of zinc precursor listed in Table 1 was mixed with the solution of Se precursor at a volume ratio of 10:1 for preparation of a solution of the zinc precursor and the Se precursor.

To 1000 mL of the InP core particle dispersed solution (In: 40 mmol), 50 mL of trioctylamine was added, and the temperature of the InP core particle dispersed solution was raised to 230° C. Next, 20 mmol of oleoyl chloride was added to the InP core particle dispersed solution, and the solution obtained was left to stand at 230° C. for 30 minutes. Then, to the InP core particle dispersed solution, the addition of the solution of zinc precursor and Se precursor was started at a rate of 44 mL/min. The addition was stopped 50 minutes after the beginning of the addition of the solution of zinc precursor and Se precursor (addition time: 50 minutes). The rising temperature of the InP core particle dispersed solution up to 280° C. at 0.5° C./min was started simultaneously when the addition of the solution of zinc precursor and Se precursor was started. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

The optical properties were measured for the resulting core/shell semiconductor nanoparticles. The results are listed in Table 2.

Example 14

(Preparation of InP Core Particle Dispersed Solution)

The InP core particle dispersed solution was obtained in the same way as in Example 13.

(Production of Core/Shell Semiconductor Nanoparticles)

To 1000 mL of the InP core particle dispersed solution (In: 40 mmol), 50 mL of trioctylamine was added, and the temperature of the InP core particle dispersed solution was raised to 230° C. Next, 20 mmol of oleoyl chloride was added to the InP core particle dispersed solution, and the solution obtained was left to stand at 230° C. for 30 minutes. Then, to the InP core particle dispersed solution, the addition of the solution of zinc precursor listed in Table 1 and the addition of the solution of Se precursor were started at rates of 40 mL/min and 4 mL/min, respectively. The addition was stopped 50 minutes after the beginning of the addition of the solution of zinc precursor and Se precursor (addition time: 50 minutes). The rising temperature of the InP core particle dispersed solution up to 280° C. at 0.5° C./min was started simultaneously when the additions of the solution of zinc precursor and the solution of Se precursor were started. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

The optical properties were measured for the resulting core/shell semiconductor nanoparticles. The results are listed in Table 2.

Example 15

(Preparation of InP Core Particle Dispersed Solution)

The InP core particle dispersed solution was obtained in the same way as in Example 13.

(Production of Core/Shell Semiconductor Nanoparticles)

To 1000 mL of the InP core particle dispersed solution (In: 40 mmol), 50 mL of trioctylamine was added, and the temperature of the InP core particle dispersed solution was raised to 230° C. Next, 20 mmol of oleoyl chloride was added to the InP core particle dispersed solution, and the solution obtained was left to stand at 230° C. for 30 minutes. Then, to the InP core particle dispersed solution, the addition of the solution of zinc precursor listed in Table 1 was started at a rate of 40 mL/min. The addition was stopped 50 minutes after the beginning of the addition of the solution of zinc precursor (addition time: 50 minutes). Next, to the resulting InP core particle dispersed solution to which the whole amount of the zinc precursor solution was completely added, the addition of the solution of Se precursor was started at a rate of 4 mL/min. The addition of the solution of Se precursor was stopped 50 minutes after the beginning of the addition of the solution of Se precursor (addition time: 50 minutes). The rising temperature of the InP core particle dispersed solution up to 280° C. at 0.5° C./min was started simultaneously when the addition of the solution of Se precursor was started. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

The optical properties were measured for the resulting core/shell semiconductor nanoparticles. The results are listed in Table 2.

Example 16

(Preparation of InP Core Particle Dispersed Solution)

The InP core particle dispersed solution was obtained in the same way as in Example 13.

(Production of Core/Shell Semiconductor Nanoparticles)

To 1000 mL of the InP core particle dispersed solution (In: 40 mmol), 50 mL of trioctylamine was added, and the temperature of the InP core particle dispersed solution was raised to 230° C. Next, 20 mmol of oleoyl chloride was added to the InP core particle dispersed solution, and the solution obtained was left to stand at 230° C. for 30 minutes. Then, to the InP core particle dispersed solution, the addition of the solution of zinc precursor listed in Table 1 was started at a rate of 667 mL/min. The addition was stopped 3 minutes after the beginning of the addition of the solution of zinc precursor (addition time: 3 minutes). Next, to the resulting InP core particle dispersed solution to which the whole amount of the zinc precursor solution was completely added, the addition of the solution of Se precursor was started at a rate of 4 mL/min. The addition was stopped 50 minutes after the beginning of the addition of the solution of Se precursor (addition time: 50 minutes). The rising temperature of the InP core particle dispersed solution up to 280° C. at 0.5° C./min was started simultaneously when the addition of the solution of Se precursor was started. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

The optical properties were measured for the resulting core/shell semiconductor nanoparticles. The results are listed in Table 2.

Comparative Example 4

(Preparation of InP Core Particle Dispersed Solution) The InP core particle dispersed solution was obtained in the same way as in Example 13.
(Production of Core/Shell Semiconductor Nanoparticles)

The process was the same as in Example 15, except that the S precursor solution was added at a rate of 4 mL/min to the InP core particle dispersed solution to which the whole amount of the zinc precursor solution was completely added. The results are listed in Table 2.

Comparative Example 5

(Preparation of InP Core Particle Dispersed Solution)

The InP core particle dispersed solution was obtained in the same way as in Example 13.
(Production of Core/Shell Semiconductor Nanoparticles)

The process was the same as in Example 16, except that the S precursor solution was added at a rate of 4 mL/min to the InP core particle dispersed solution to which the whole amount of the zinc precursor solution was completely added. The results are listed in Table 2.

Comparative Example 6

(Preparation of InP Core Particle Dispersed Solution)

The InP core particle dispersed solution was obtained in the same way as in Example 13.
(Production of Core/Shell Semiconductor Nanoparticles)

To 1000 mL of the InP core particle dispersed solution (In: 40 mmol), 50 mL of trioctylamine was added, and the temperature of the InP core particle dispersed solution was raised to 230° C. Then, after the temperature reached to 230° C., to the InP core particle dispersed solution, the addition of the solution of zinc precursor listed in Table 1 and the addition of the solution of Se precursor were started simultaneously at rates of 667 mL/min and 66.7 mL/min, respectively. The additions were stopped 3 minutes after the beginning of the additions of the solution of zinc precursor and the solution of Se precursor (addition time: 3 minutes). The rising temperature of the InP core particle dispersed solution up to 280° C. at 0.5° C./min was started simultaneously when the additions of the solution of zinc precursor and the solution of Se precursor were started. Next, the heating was stopped 60 minutes after the temperature of the InP core particle-dispersed solution reached 280° C. The solution was cooled down to room temperature (25° C.) to provide the core/shell semiconductor nanoparticle-dispersed solution (reaction solution).

The purification was then performed in the same way as in Example 1 to provide the purified core/shell semiconductor nanoparticles.

The optical properties were measured for the resulting core/shell semiconductor nanoparticles. The results are listed in Table 2.

Comparative Example 7

The process was the same as in Example 14, except that the zinc precursor was the zinc carboxylate listed in Table 1. The results are listed in Table 2.

Comparative Example 8

Despite the attempt to perform the process was the same as in Example 13 except that the zinc precursor was the zinc carboxylate listed in Table 1, the addition caused tube clogging multiple times. Although the addition was continued while eliminating the clogging problem, the resulting particles were aggregated with each other to cause problems in the optical property measurement.

TABLE 1

| | Zinc precursor | Solvent | Group VI | Another additive | Addition Zn/In molar ratio | Addition time | Before addition | Reaction temperature | Reaction time |
|---|---|---|---|---|---|---|---|---|---|
| Example 1 | Zinc 3,5,5-trimethylhexanoate | Octadecene | Se | — | 15 | Within one minute | 230° C. | 280° C. | 60 min |
| Example 2 | Zinc 3,5,5-trimethylhexanoate | Octadecene | Se | — | 15 | 50 min | 230° C. | 280° C. | 60 min |
| Example 3 | Zinc 3,5,5-trimethylhexanoate | Octadecene | Se | — | 15 | 50 min | 230° C. | 280° C. | 60 min |
| Example 4 | Zinc 3,5,5-trimethylhexanoate | Octadecene | Se | Oleoyl chloride | 15 | 50 min | 230° C. | 280° C. | 60 min |
| Example 5 | Zinc 2-ethylhexanoate | Octadecene | Se | Oleoyl chloride | 15 | 50 min | 230° C. | 280° C. | 60 min |
| Example 6 | Zinc 16-methylheptadecanoate | Octadecene | Se | Oleoyl chloride | 15 | 50 min | 230° C. | 280° C. | 60 min |
| Example 7 | Zinc 3,5,5-trimethylhexanoate | Octadecene | Se, S | Oleoyl chloride | 15 | 50 min | 230° C. | 280° C. | 60 min |
| Example 8 | Zinc 3,5,5-trimethylhexanoate | Octadecene | Se, S | Oleoyl chloride | 15 | 50 min | 230° C. | 280° C. | 60 min |
| Example 9 | Zinc 3,5,5-trimethylhexanoate | Octadecene | Se, S | Oleoyl chloride | 30 | 50 min | 230° C. | 280° C. | 60 min |
| Example 10 | Zinc 3,5,5-trimethylhexanoate | Octadecene | Se | Oleoyl chloride | 15 | 100 min | 230° C. | 280° C. | 60 min |
| Example 11 | Zinc 3,5,5-trimethylhexanoate | Octadecene | Se | Oleoyl chloride | 15 | 400 min | 230° C. | 280° C. | 60 min |
| Example 12 | Zinc 3,5,5-trimethylhexanoate | Squalene | Se | Oleoyl chloride | 15 | 50 min | 230° C. | 280° C. | 60 min |
| Comparative example 1 | Zinc laurate | Octadecene | Se | — | 15 | Within one minute | 230° C. | 280° C. | 60 min |
| Comparative example 2 | Zinc laurate | Octadecene | Se | — | 15 | 50 min | 230° C. | 280° C. | 60 min |
| Comparative example 3 | Zinc laurate | Octadecene | Se | — | 15 | 50 min | 230° C. | 280° C. | 60 min |
| Example 13 | Zinc 2-ethylhexanoate | Octadecene | Se | Oleoyl chloride | 15 | 50 min | 230° C. | 280° C. | 60 min |
| Example 14 | Zinc 2-ethylhexanoate | Octadecene | Se | Oleoyl chloride | 15 | 50 min | 230° C. | 280° C. | 60 min |
| Example 15 | Zinc 2-ethylhexanoate | Octadecene | Se | Oleoyl chloride | 15 | Zn: 50 min Se: 50 min | 230° C. | 280° C. | 60 min |

TABLE 1-continued

|  | Zinc precursor | Solvent | Group VI | Another additive | Addition Zn/In molar ratio | Addition time | Before addition | Reaction temperature | Reaction time |
|---|---|---|---|---|---|---|---|---|---|
| Example 16 | Zinc 2-ethylhexanoate | Octadecene | Se | Oleoyl chloride | 15 | Zn: 3 min Se: 50 min | 230° C. | 280° C. | 60 min |
| Comparative example 4 | Zinc laurate | Octadecene | S | Oleoyl chloride | 15 | Zn: 50 min Se: 50 min | 230° C. | 280° C. | 60 min |
| Comparative example 5 | Zinc laurate | Octadecene | S | Oleoyl chloride | 15 | Zn: 3 min Se: 50 min | 230° C. | 280° C. | 60 min |
| Comparative example 6 | Zinc laurate | Octadecene | Se | — | 15 | 50 min | 230° C. | 280° C. | 60 min |
| Comparative example 7 | Zinc laurate | Octadecene | Se | Oleoyl chloride | 15 | 50 min | 230° C. | 280° C. | 60 min |
| Comparative example 8 | Zinc laurate | Octadecene | Se | Oleoyl chloride | 15 | 50 min | 230° C. | 280° C. | 60 min |

TABLE 2

|  | Core/shell | | | Core/shell/shell | | |
|---|---|---|---|---|---|---|
|  | λmax | FWHM | PLQY | λmax | FWHM | PLQY |
| Example 1 | 524 | 38.2 | 58 | 524 | 38.9 | 67 |
| Example 2 | 525 | 36.5 | 60 | 525 | 36.4 | 70 |
| Example 3 | 525 | 36.4 | 59 | 525 | 36.6 | 68 |
| Example 4 | 527 | 30.8 | 85 | 528 | 31.4 | 92 |
| Example 5 | 528 | 32.2 | 86 | 528 | 32.6 | 90 |
| Example 6 | 528 | 31.5 | 83 | 528 | 32.0 | 89 |
| Example 7 | 528 | 31.6 | 86 | 529 | 31.9 | 90 |
| Example 8 | 526 | 34.2 | 90 | 526 | 34.1 | 92 |
| Example 9 | 526 | 34.3 | 90 | 526 | 34.2 | 91 |
| Example 10 | 527 | 32.8 | 88 | 526 | 33.2 | 87 |
| Example 11 | 526 | 32.5 | 84 | 526 | 32.9 | 91 |
| Example 12 | 525 | 33.3 | 86 | 525 | 33.8 | 90 |
| Comparative example 1 | 525 | 40.1 | 43 | 524 | 41.3 | 55 |
| Comparative example 2 | 545 | 49.8 | 28 | 544 | 48.2 | 51 |
| Comparative example 3 | 548 | 55.7 | 45 | 547 | 55.0 | 75 |
| Example 13 | 527 | 30.7 | 84 | — | — | — |
| Example 14 | 527 | 30.7 | 84 | — | — | — |
| Example 15 | 526 | 31.1 | 83 | — | — | — |
| Example 16 | 526 | 32.2 | 85 | — | — | — |
| Comparative example 4 | 520 | 36.5 | 71 | — | — | — |
| Comparative example 5 | 518 | 38.8 | 74 | — | — | — |
| Comparative example 6 | 525 | 40.1 | 43 | — | — | — |
| Comparative example 7 | 545 | 49.8 | 28 | — | — | — |
| Comparative example 8 | — | — | — | — | — | — |

In Example 4, with the use of zinc 3,5,5-trimethylhexanoate as the zinc precursor at the shell formation step, the 3,5,5-trimethylhexanoic acid derived from the zinc precursor was confirmed to be coordinated as a ligand to the resulting core/shell semiconductor nanoparticles. In Example 5, with the use of zinc 2-ethylhexanoate as the zinc precursor at the shell formation step, 2-ethylhexanoic acid derived from the zinc precursor is confirmed to be coordinated as a ligand to the resulting core/shell semiconductor nanoparticles. In Examples 1 to 3 and 6 to 12, zinc branched chain carboxylates are used as the zinc precursors at the shell formation step in the same way as in Examples 4 and 5, possibly enabling the branched chain carboxylic acid derived from the zinc precursor to be coordinated as the ligand to the resulting core/shell semiconductor nanoparticles, as in Examples 4 and 5.

The invention claimed is:

1. A method of producing core/shell semiconductor nanoparticles, the method comprising:
    a shell formation step of adding a solution of a group VI element precursor while adding a solution of a zinc branched chain carboxylate to a core particle-dispersed solution of a core comprising a group III element and a group V element, thereby allowing the zinc branched chain carboxylate to react with the group VI element precursor in presence of the core, forming a shell comprising zinc and the group VI element on a surface of the core,
    wherein the group VI element includes at least Se.

2. The method of producing core/shell semiconductor nanoparticles according to claim 1, wherein the group III element is In and the group V element is P.

3. The method of producing core/shell semiconductor nanoparticles according to claim 1, wherein the solution of the zinc branched chain carboxylate is in liquid form at 25° C. and 1 atm.

4. The method of producing core/shell semiconductor nanoparticles according to claim 1, wherein the zinc branched chain carboxylate reacts with the group VI element precursor at 180 to 320° C.

5. The method of producing core/shell semiconductor nanoparticles according to claim 2, wherein the zinc branched chain carboxylate is added to meet a molar ratio of Zn (Zn/In) ranging from 7 to 50 with respect to In in the core.

6. The method of producing core/shell semiconductor nanoparticles according to claim 1, the method comprising adding, to the core particle-dispersed solution while heating the core particle-dispersed solution,
    the solution of the zinc branched chain carboxylate and the solution of the group VI element precursor including at least the Se precursor.

7. The method of producing core/shell semiconductor nanoparticles according to claim 1, wherein the zinc branched chain carboxylate reacts with the group VI element precursor in presence of a halogen element.

8. The method of producing core/shell semiconductor nanoparticles according to claim 1, the method not comprising a step of purifying the core particles.

9. A method of producing core/shell semiconductor nanoparticles, the method comprising a shell formation step of adding a solution of zinc branched chain carboxylate and group VI element precursor to a core particle-dispersed solution to allow the zinc branched chain carboxylate to react with the group VI element precursor in presence of the core particles for forming a shell containing zinc and the group VI element on surfaces of the core particles.

10. The method of producing core/shell semiconductor nanoparticles according to claim 9, wherein the group VI element includes at least Se.

11. The method of producing core/shell semiconductor nanoparticles according to claim 9, wherein the core particles contain In and P.

12. The method of producing core/shell semiconductor nanoparticles according to claim 9, wherein the solution of zinc branched chain carboxylate and group VI element precursor is in liquid form at 25° C. and 1 atm.

13. The method of producing core/shell semiconductor nanoparticles according to claim 9, wherein the zinc branched chain carboxylate reacts with the group VI element precursor at 180 to 320° C.

14. The method of producing core/shell semiconductor nanoparticles according to claim 11, wherein the zinc branched chain carboxylate is added to meet a molar ratio of Zn (Zn/In) ranging from 7 to 50 with respect to In in the core particles.

15. A method of producing core/shell semiconductor nanoparticles, the method comprising a shell formation step of adding a solution of zinc branched chain carboxylate to a core particle-dispersed solution and then adding a solution of group VI element precursor including at least Se precursor to allow the zinc branched chain carboxylate to react with the group VI element precursor in presence of the core particles for forming a shell containing zinc and the group VI element on surfaces of the core particles, wherein the core of the core particle-dispersed solution includes a group III element and a group V element.

16. The method of producing core/shell semiconductor nanoparticles according to claim 15, wherein the group III element is In and the group V element is P.

17. The method of producing core/shell semiconductor nanoparticles according to claim 15, wherein the solution of zinc branched chain carboxylate is in liquid form at 25° C. and 1 atm.

18. The method of producing core/shell semiconductor nanoparticles according to claim 15, wherein the zinc branched chain carboxylate reacts with the group VI element precursor at 180 to 320° C.

19. The method of producing core/shell semiconductor nanoparticles according to claim 16, wherein the zinc branched chain carboxylate is added to meet a molar ratio of Zn (Zn/In) ranging from 7 to 50 with respect to In in the core particles.

* * * * *